US012537016B2

United States Patent
Xiao et al.

(10) Patent No.: US 12,537,016 B2
(45) Date of Patent: Jan. 27, 2026

(54) METHODS AND SYSTEMS FOR DETERMINING SPEECH PRESENCE PROBABILITY, SPEECH ENHANCEMENT METHODS AND SYSTEMS, AND HEADPHONES

(71) Applicant: SHENZHEN SHOKZ CO., LTD., Guangdong (CN)

(72) Inventors: Le Xiao, Shenzhen (CN); Chengqian Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 294 days.

(21) Appl. No.: 18/305,398

(22) Filed: Apr. 24, 2023

(65) Prior Publication Data
US 2023/0260529 A1 Aug. 17, 2023

Related U.S. Application Data

(63) Continuation of application No. PCT/CN2021/123111, filed on Oct. 11, 2021.

(51) Int. Cl.
*G10L 21/0232* (2013.01)
*G10L 21/0216* (2013.01)

(52) U.S. Cl.
CPC .......... *G10L 21/0232* (2013.01); *G10L 2021/02166* (2013.01)

(58) Field of Classification Search
CPC . G10L 21/0232; G10L 25/78; G10L 21/0216; G10L 21/02; G10L 21/0208;
(Continued)

(56) References Cited

U.S. PATENT DOCUMENTS

2007/0055508 A1* 3/2007 Zhao .................. G10L 21/0216
704/226
2019/0259381 A1* 8/2019 Ebenezer ............... H04R 3/005

FOREIGN PATENT DOCUMENTS

CN 111883181 A 11/2020
CN 113270106 A 8/2021
(Continued)

OTHER PUBLICATIONS

Martín-Doñas et al. "Online Multichannel Enhancement Based on Recursive EM and DNN-Based Speech Presence Estimation", Nov. 9, 2020, IEEE https://ieeexplore.ieee.org/document/9252844 (Year: 2020).*

(Continued)

*Primary Examiner* — Yogeshkumar Patel
(74) *Attorney, Agent, or Firm* — METIS IP LLC

(57) ABSTRACT

The present disclosure provides a method and system for determining a speech presence probability, a speech enhancement method and system, and a headphone. The speech presence probability and a speech absence probability in an iteration operation may be corrected by comparing an entropy of the speech presence probability and an entropy of a speech absence probability, such that a faster convergence speed and better convergence results may be obtained, thereby improving accuracy of an estimation of the speech presence probability and an accuracy of an estimation of a noise spatial covariance matrix, and then improving a speech enhancement effect of a minimum variance distortionless response (MVDR).

12 Claims, 9 Drawing Sheets

(58) Field of Classification Search
CPC . G10L 21/0272; G10L 21/0264; G10L 15/20; G10L 15/08; G10L 15/14; G10L 25/84; G10L 15/22; G10L 15/25; G10L 2021/02166; H04R 1/1075; H04R 1/406; H04R 5/027; H04R 3/005; H04R 25/407; H04R 25/405

See application file for complete search history.

(56) References Cited

FOREIGN PATENT DOCUMENTS

| | | |
|---|---|---|
| JP | H11164382 A | 6/1999 |
| JP | 2013054258 A | 3/2013 |

OTHER PUBLICATIONS

Zhu, Xunyu et al., Research on Speech Enhancement Algorithm Based on Microphone Linear Array, Journal of Hangzhou Dianzi University(Natural Sciences), 40(5): 30-33&72, 2020.

The Extended European Search Report in European Application No. 21960151.5 mailed on Nov. 24, 2023, 6 pages.

Juan Manuel Martín-Doñas et al., Online Multichannel Speech Enhancement Based on Recursive EM and DNN-Based Speech Presence Estimation, IEEE/ACM Transactions on Audio, Speech, and Language Processing, 2020, 15 pages.

Anonymous, Continuous Rotation Mic Boom Based on Contactless Connection System, IP.com, 2015, 5 pages.

Notice of Reasons for Rejection in Japanese Application No. 2023-542599 mailed on Sep. 30, 2024, 8 pages.

* cited by examiner

METHODS AND SYSTEMS FOR DETERMINING SPEECH PRESENCE PROBABILITY, SPEECH ENHANCEMENT METHODS AND SYSTEMS, AND HEADPHONES

CROSS-REFERENCE TO RELATED APPLICATIONS

This application is a Continuation of International Application No. PCT/CN2021/123111, filed on Oct. 11, 2021, the entire contents of which are incorporated herein by reference.

TECHNICAL FIELD

The present disclosure relates to the technical field of speech signal processing, and in particular to methods and systems for determining a speech presence probability, speech enhancement methods and systems, and headphones.

BACKGROUND

In a speech enhancement technology based on a beamforming algorithm, for example, an adaptive beamforming algorithm of a minimum variance distortionless response (MVDR) algorithm, it is important to solve a parameter (i.e., a noise covariance matrix) describing a relationship between noise statistical characteristics of different microphones. A method for determining the noise covariance matrix in the prior art is mainly based on the speech presence probability, e.g., determining the noise covariance matrix by estimating, using a voice activity detection (VAD) algorithm, the speech presence probability. However, the accuracy of the estimation of the speech presence probability in the prior art is relatively low, which may result in low accuracy of the estimation of the noise covariance matrix and a poor speech enhancement effect of the MVDR algorithm, especially when a count of microphones is small, e.g., less than 5, the speech enhancement effect drops sharply. Therefore, the MVDR algorithm in the prior art is mostly used in microphone array devices with a large count of microphones with a large spacing, such as mobile phones and smart loudspeakers. However, the speech enhancement effect is poor for devices with a small count of microphones with a small spacing, such as headphones.

Therefore, it is desirable to provide a method and a system for determining a speech presence probability with higher accuracy, a speech enhancement method and system, and a headphone.

SUMMARY

The present disclosure provides a method and a system for determining a speech presence probability with higher accuracy, a speech enhancement method and system, and a headphone.

A first aspect of the present disclosure provides a method for determining a speech presence probability applied to M microphones arranged in a preset array, M being an integer greater than 1. The method may include: obtaining microphone signals output by the M microphones, the microphone signals satisfying a first model or a second model of a Gaussian distribution, one of the first model and the second model being a speech presence model, and the other of the first model and the second model being a speech absence model; optimizing the first model and the second model by performing an iteration operation on the first model and the second model based on maximum likelihood estimation (MLE) and an expectation maximization (EM) algorithm until the MLE and the EM algorithm converge, and the iteration operation including determining whether the speech presence model is the first model or the second model based on an entropy of a probability that the microphone signals satisfy the first model and an entropy of a second probability that the microphone signals satisfy the second model, the first probability being complementary to the second probability; and in response to that the MLE and the EM algorithm converges, determining a probability that the microphone signals satisfy the speech presence model as a speech presence probability of the microphone signals and outputting the speech presence probability.

In some embodiments, a first variance of the Gaussian distribution corresponding to the first model may include a product of a first parameter and a first spatial covariance matrix; and a second variance of the Gaussian distribution corresponding to the second model may include a product of a second parameter and a second spatial covariance matrix.

In some embodiments, the optimizing the first model and the second model by performing an iteration operation on the first model and the second model based on maximum likelihood estimation (MLE) and an expectation maximization (EM) algorithm may include: constructing an objective function based on the MLE and the EM algorithm; determining optimization parameters, wherein the optimization parameters may include the first spatial covariance matrix and the second spatial covariance matrix; determining initial values of the optimization parameters; performing a plurality of iterations on the optimization parameters based on the objective function and the initial values of the optimization parameters, until the objective function converges by: in the plurality of iterations, determining whether the speech presence model is the first model or the second model based on the entropy of the first probability and the entropy of the second probability; and outputting convergence values of the optimization parameters and the corresponding first probability and the second probability.

In some embodiments, the determining whether the speech presence model is the first model or the second model based on the entropy of the first probability and the entropy of the second probability in the plurality of iterations may include: in each iteration of the plurality of iterations, determining the entropy of the first probability and the entropy of the second probability, and determining whether the speech presence model is the first model or the second model by: in response to determining that the entropy of the first probability is greater than the entropy of the second probability, determining that the speech presence model is the second model; or in response to determining that the entropy of the first probability is less than the entropy of the second probability, determining that the speech presence model is the first model.

In some embodiments, the determining whether the speech presence model is the first model or the second model based on the entropy of the first probability and the entropy of the second probability in the plurality of iterations may include: in a first iteration of the plurality of iterations, determining the entropy of the first probability and the entropy of the second probability, and determining whether the speech presence model is the first model or the second model by: in response to determining that the entropy of the first probability is greater than the entropy of the second probability, determining that the speech presence model is the second model; or in response to determining that the entropy of the first probability is less than the entropy of the second probability, determining that the speech presence model is the first model.

In some embodiments, wherein the performing the plurality of iterations on the optimization parameters further may include, in each iteration of the plurality of iterations: correcting the first probability and the second probability based on the entropy of the first probability and the entropy of the second probability by: in response to determining that the first model is the speech presence model and the entropy of the first probability is greater than the entropy of the second probability, designating the second probability as a corrected first probability and designating the first probability as a corrected second probability; or in response to determining that the second model is the speech presence model and the entropy of the second probability is greater than the entropy of the first probability, designating the second probability as a corrected first probability and designating the first probability as a corrected second probability; and updating the optimization parameters based on the corrected first probability and the corrected second probability.

In some embodiments, wherein the performing the plurality of iterations on the optimization parameters may further include, in each iteration of the plurality of iterations: performing a reversible correction on the optimization parameters by: in response to determining that the optimization parameters are irreversible, correcting the optimization parameters based on a deviation matrix, the deviation matrix including one of an identity matrix, or a random matrix obeying a normal distribution or a uniform distribution.

A second aspect of the present disclosure further provides a system for determining a speech presence probability. The system may include at least one storage medium storing at least one set of instructions for determining the speech presence probability; and at least one processor in communication with the at least one storage medium, wherein when executing the instructions, the at least one processor is configured to direct the system to implements the method for determining the speech presence probability in the first aspect of the present disclosure.

A third aspect of the present disclosure further provides a speech enhancement method applied to M microphones arranged in a preset array, M being an integer greater than 1. The speech enhancement method may include: obtaining microphone signals output by the M microphones; determining a speech presence probability of the microphone signals based on the method for determining the speech presence probability in the first aspect of the present disclosure; determining a noise covariance matrix of the microphone signals based on the speech presence probability; determining filter coefficients corresponding to the microphone signals based on the MVDR algorithm and the noise spatial covariance matrix; and outputting a target audio signal by combining the microphone signals based on the filter coefficients.

A fourth aspect of the present disclosure further provides a speech enhancement system, including at least one storage medium storing at least one set of instructions for voice enhancement; and at least one processor in communication with the at least one storage medium, wherein when executing the instructions, the at least one processor is configured to direct the system to implement the speech enhancement method in the third aspect of the present disclosure.

A fifth aspect of the present disclosure further provides a headphone, including a microphone array and a computing device. The microphone array may include M microphones arranged in a preset array, and M may be an integer greater than 1; the computing device may be in communication connection to the microphone array during operation, and implement the speech enhancement method in the third aspect of the present disclosure.

In some embodiments, the M microphones may be linearly distributed, M may be less than or equal to 5, and a distance between adjacent microphones among the M microphones may be within a range of 20 mm-40 mm.

In some embodiments, the headphone may further include a first housing and a second housing. The microphone array may be mounted on the first housing. The first housing may include a first interface including a first magnetic device. The computing device may be mounted on the second housing. The second housing may include a second interface including a second magnetic device. An adsorption force between the first magnetic device and the second magnetic device may enable a detachable connection between the first housing and the second housing.

In some embodiments, the first housing may further include one or more contact points disposed at the first interface and in communication connection to the microphone array; the second housing may further include a guide rail disposed at the second interface and in communication connection to the computing device. When the first housing is connected to the second housing, the one or more contact points may be in contact with the guide rail, such that the microphone array is in communication connection to the computing device.

According to the technical solutions provided herein, the method and the system for determining the speech presence probability, the speech enhancement method and system, and the headphone may be applied to a microphone array including a plurality of microphones. Each microphone in the microphone array may collect an audio from a plurality of sound sources in the space, and output a corresponding microphone signal. An audio signal of each sound source may satisfy a Gaussian distribution. A plurality of microphone signals output by the plurality of microphone arrays may satisfy a joint Gaussian distribution. In order to obtain the speech presence probability of the plurality of microphone signals, the method and the system for determining the speech presence probability, the speech enhancement method and system, and the headphone may obtain a speech presence model and a speech absence model. The speech presence model may correspond to circumstances when the plurality of microphone signals include speech. The speech absence model may correspond circumstances when the plurality of microphone signals do not include speech. Then the speech presence model and the speech absence model may be optimized by performing, based on a maximum likelihood estimation (MLE) and an expectation maximization (EM) algorithm, an iteration operation on the speech presence model and the speech absence model, and a speech presence probability and a speech absence probability may be corrected in the iteration operation according to an entropy of the speech presence probability and an entropy of the speech absence probability. Thereby, model parameters of the speech presence model and model parameters of the speech absence model may be determined, and the speech presence probability corresponding to the speech presence model may be obtained when the MLE and the EM algorithm converge. According to the method and the system for determining the speech presence probability, the speech enhancement method and system, and the headphone, the speech presence probability and the speech absence probability in the iteration operation may be corrected by comparing the entropy of the speech presence probability and the entropy of the speech absence probability, such that a faster convergence speed and better convergence results may be obtained, which may improve the accuracy of the estimation of the speech presence probability and the accuracy of the estimation of the noise spatial covariance matrix, thereby improving the speech enhancement effect of the MVDR algorithm.

Other functions of the method and the system for determining the speech presence probability, the speech enhancement method and system, and the headphone provided in the present disclosure will be listed in the following description. The following figures and example presentations will be apparent to those skilled in the art from the description. The inventive aspects of the method and the system for determining the speech presence probability, the speech enhancement method and system, and the headphone can be fully explained by practice or using the methods, devices, and combinations described in the following detailed examples.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

DETAILED DESCRIPTION

Figure 1:
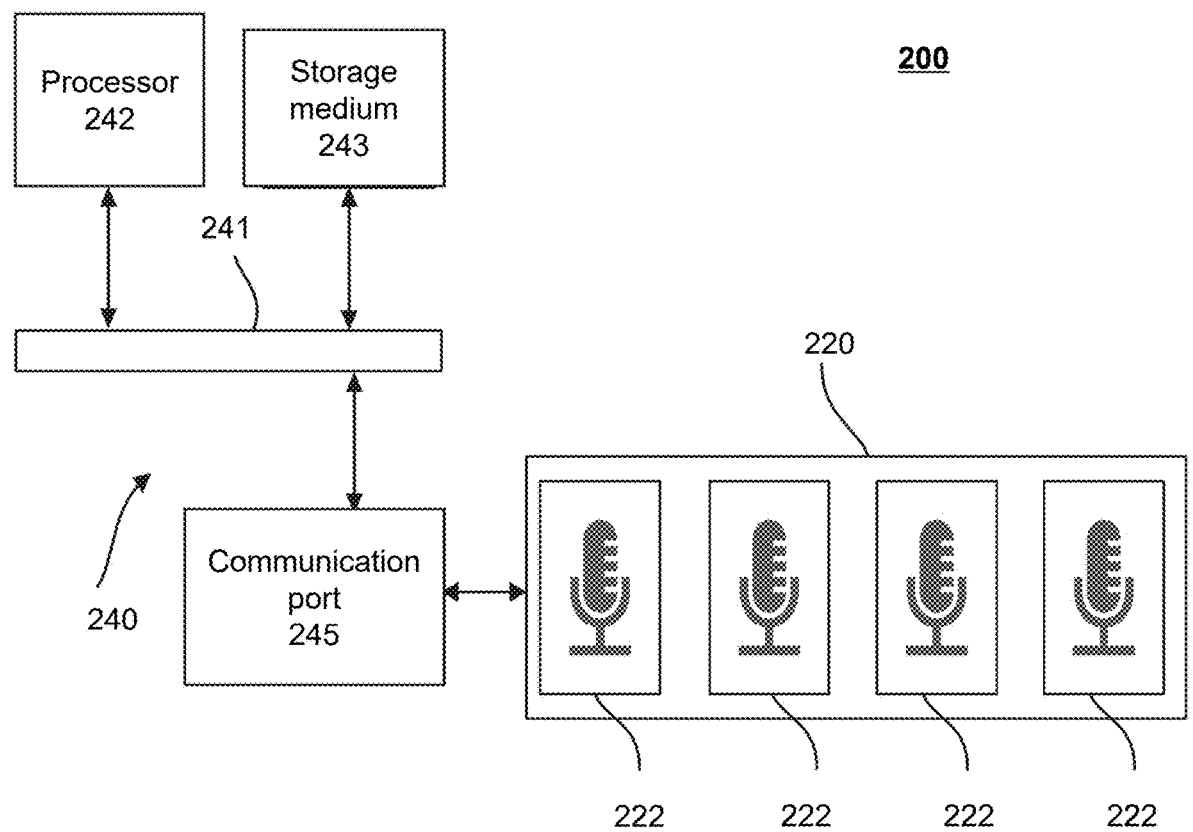
FIG. 1 is a schematic diagram illustrating hardware of a system for determining a speech presence probability according to some embodiments of the present disclosure.

The following description provides specific application scenarios and requirements of the present disclosure, with the purpose of enabling those skilled in the art to manufacture and use the contents of the present disclosure. Various local modifications to the disclosed embodiments will be readily apparent to those skilled in the art, and the general principles defined herein may be applied to other embodiments and applications without departing from the spirit and scope of the present disclosure. Accordingly, the present disclosure is not limited to the embodiments herein, but is to be accorded the widest scope consistent with the claims.

The terminology used herein is to describe particular example embodiments only and is not intended to be limiting. For example, as used herein, the singular forms "a," "an," and "the" may also include the plural forms unless the context clearly dictates otherwise. When used in the present disclosure, the terms "comprising," "comprise," "including," and/or "include" mean the presence of an associated integer, step, operation, element, and/or component, but do not exclude one or more other features, integers, steps, operations, elements, components, and/or groups, or other features, integers, steps, operations, elements, components, and/or groups may be added to the system/method.

These and other features of the present disclosure, as well as the operations and functions of the relevant elements of the structure, and the economy of assembly and manufacturing of the components, may be significantly enhanced in view of the following description. All of which form a part of the present disclosure with reference to the accompanying drawings. It should be clearly understood, however, that the drawings are for purposes of illustration and description only and are not intended to limit the scope of the present disclosure. It should also be understood that the drawings are not drawn to scale.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

For the convenience of description, the terms described in the present disclosure are explained as follows.

A minimum variance distortionless response (MVDR) algorithm is an adaptive beamforming algorithm based on a maximum signal-to-interference-noise ratio (SINR) criterion. The MVDR algorithm may adaptively minimize a power of an array output in a desired direction and maximize the SINR, thereby minimizing a variance of a recorded signal. If a noise signal is uncorrelated with a desired signal, the variance of the recorded signal is a sum of a variance of the desired signal and a variance of the noise signal. Therefore, the MVDR algorithm seeks to minimize the sum, thereby mitigating an impact of the noise signal. The principle of the MVDR algorithm is to select appropriate filter coefficients under a constraint that the desired signal is not distorted to minimize an average power output by the array.

The speech presence probability refers to a probability that a target speech signal presents in the current audio signal.

Gaussian distribution is also known as "normal distribution." A normal curve is bell-shaped, low at both ends, high in the middle, and symmetrical. The normal curve is also referred to as a bell curve because of its bell shape. If a random variable X that obeys a normal distribution with a mathematical expectation of u and a variation of $\sigma^2$ may be denoted as $N(\mu, \sigma^2)$. An expected value u when a probability density function obeys the normal distribution determines a position of the random variable X, and a standard deviation σ of the random variable X determines a magnitude of the distribution. When $\mu=0$, $\sigma=1$, the normal distribution is a standard normal distribution.

FIG. 1 is a schematic diagram illustrating hardware of a system for determining a speech presence probability according to some embodiments of the present disclosure. The system for determining the speech presence probability may be applied to an electronic device 200.

In some embodiments, the electronic device 200 may be a wireless headphone, a wired headphone, or a smart wearable device, e.g., a device with an audio processing function, such as smart glasses, a smart helmet, or a smart watch. The electronic device 200 may also be a mobile device, a tablet computer, a laptop computer, a vehicle built-in device, or the like, or any combination thereof. In some embodiments, the mobile device may include a smart home device, a smart mobile device, or the like, or any combination thereof. For example, the smart mobile device may include a mobile phone, a personal digital assistant, a game device, a navigation device, an ultra-mobile personal computer (UMPC), or the like, or any combination thereof. In some embodiments, the smart home device may include a smart TV, a desktop computer, or the like, or any combination thereof. In some embodiments, the vehicle built-in device may include an on-board computer, on-board television, or the like.

In the present disclosure, the electronic device 200 is described by taking the headphone as an example. The headphone may be a wireless earphone or a wired earphone. As shown in FIG. 1, the electronic device 200 may include a microphone array 220 and a computing device 240.

The microphone array 220 may be an audio acquisition device of the electronic device 200. The microphone array 220 may be configured to obtain a local audio and output microphone signals, i.e., electronic signals carrying audio information. The microphone array 220 may include M microphones 222 arranged in a preset array. M may be an integer greater than 1. The M microphones 222 may be distributed uniformly or non-uniformly. The M microphones 222 may output microphone signals. The M microphones 222 may output M microphone signals. Each microphone 222 may correspond to a microphone signal. The M microphone signals may be collectively referred to as the microphone signals. In some embodiments, the M microphones 222 may be linearly distributed. In some embodiments, the M microphones 222 may also be arranged in arrays of other shapes, such as a circular array, a rectangular array, or the like. For the convenience of description, the M microphones 222 linearly distributed may be taken as an example for description below. In some embodiments, M may be any integer greater than 1, such as 2, 3, 4, 5, or more. In some embodiments, M may be an integer greater than 1 and less than or equal to 5 due to space constraints in, for example, a product like a headphone. When the electronic device 200 is the headphone, a distance between adjacent microphones 222 among the M microphones 222 may be within a range of 20 mm-40 mm. In some embodiments, the distance between adjacent microphones 222 may be smaller, e.g., within a range of 10 mm-20 mm.

In some embodiments, the microphone(s) 222 may include a bone conduction microphone that directly collects vibration signals of the human body. The bone conduction microphone may include a vibration sensor, such as an optical vibration sensor, an acceleration sensor, or the like. The vibration sensor may collect a mechanical vibration signal (e.g., a signal generated by the vibration of the skin or bones when a user speaks), and convert the mechanical vibration signal into an electrical signal. The mechanical vibration signal may mainly refer to a vibration transmitted through the solid. The bone conduction microphones may contact the user's skin or bones through the vibration sensor or a vibration component connected to the vibration sensor, thereby collecting the vibration signal generated by the bones or skin when the user makes a sound, and converting the vibration signal into the electrical signal. In some embodiments, the vibration sensor may be a device that is sensitive to a mechanical vibration but insensitive to an air vibration (i.e., a response capability of the vibration sensor to the mechanical vibration may exceed a response capability of the vibration sensor to the air vibration.). As the bone conduction microphones may directly pick up a vibration signal of a sound-emitting part, the bone conduction microphones may reduce the influence of environmental noise.

In some embodiments, the microphone(s) 222 may also be an air-conduction microphone that directly collects an air vibration signal. The air conduction microphone may collect the air vibration signal caused by the user when making a sound, and convert the air vibration signal into an electrical signal.

In some embodiments, the M microphones 220 may include M bone conduction microphones. In some embodiments, the M microphones 220 may be M air conduction microphones. In some embodiments, the M microphones 220 may include one or more bone conduction microphones and one or more air conduction microphones. The microphones 222 may also be other types of microphones, such as an optical microphone, a microphone that receives a myoelectric signal, or the like.

The computing device 240 may be in communication connection to the microphone array 220. The communication connection may refer to any form of connection capable of receiving information directly or indirectly. In some embodiments, the computing device 240 may communicate data with the microphone array 220 via a wireless communication connection. In some embodiments, the computing device 240 may also be directly connected to the microphone array 220 through a wire to communicate data with each other. In some embodiments, the computing device 240 may also establish an indirect connection with the microphone array 220 by directly connecting to other circuits through wires, thereby communicating data with each other. In the present disclosure, the computing device 240 directly connected to the microphone array 220 through the wires may be taken as an example for description.

The computing device 240 may be a hardware device with a data information processing function. In some embodiments, the system for determining the speech presence probability may include the computing device 240. In some embodiments, the system for determining the speech presence probability may be applied to the computing device 240. That is, the system for determining the speech presence probability may operate on the computing device 240. The system for determining the speech presence probability may comprise a hardware device with a data information processing function and a necessary program for driving the hardware device to work. The system for determining the speech presence probability may also be only a hardware device with data processing capability, or just a program operating on the hardware device.

The system for determining the speech presence probability may store data or instructions for implementing the method for determining the speech presence probability of the present disclosure, and may implement the data and/or instructions. When the system for determining the speech presence probability operates on the computing device 240, the system for determining the speech presence probability may obtain the microphone signals from the microphone array 220 based on the communication connection, and implement the data or the instructions of the method for determining the speech presence probability described in the present disclosure, thereby determining the speech presence probability in the microphone signals. The method for determining the speech presence probability may be described elsewhere in the present disclosure. For example, the method for determining the speech presence probability is described in FIGS. 3-6.

As shown in FIG. 1, the computing device 240 may include at least one storage medium 243 and at least one processor 242. In some embodiments, the electronic device 200 may further include a communication port 245 and an internal communication bus 241.

The internal communication bus 241 may connect various system components, including the storage medium 243, the processor 242, and the communication port 245.

The communication port 245 may be used for data communication between the computing device 240 and the outside. For example, the computing device 240 may obtain the microphone signals from the microphone array 220 via the communication port 245.

The at least one storage medium 243 may include a data storage device. The data storage device may be a non-transitory storage medium or a transitory storage medium. For example, the data storage device may include one or more of a magnetic disk, a read-only memory (ROM), or a random access memory (RAM). When the system for determining the speech presence probability is operated on the computing device 240, the storage medium 243 may store at least one instruction set used for determining the speech presence probability for the microphone signals. The instructions may be computer program codes. The computer program codes may include programs, routines, objects, components, data structures, procedures, modules, etc., for implementing the method for determining the speech presence probability in the present disclosure.

The at least one processor 242 may be in communication connection to the at least one storage medium 243 through the internal communication bus 241. The communication connection may refer to any form of connection capable of receiving information directly or indirectly. The at least one processor 242 may be configured to implement the at least one instruction set. When the system for determining the speech presence probability is operated on the computing device 240, the at least one processor 242 may read the at least one instruction set, and implement the method for determining the speech presence probability according to the instructions of the at least one instruction set. The processor 242 may implement all the operations included in the method for determining the speech presence probability. The processor 242 may be in the form of one or more processors. In some embodiments, the processor 242 may include one or more hardware processors, such as a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of implementing one or more functions, or the like, or any combination thereof. For illustration only, only one processor 242 is described in the computing device 240 of the present disclosure. However, it should be noted that the computing device 240 of the present disclosure may further include a plurality of processors 242. Therefore, the operations and/or method steps disclosed in the present disclosure may be implemented by one processor as described in the present disclosure, or by a plurality of processors jointly. For example, if the processor 242 of the computing device 240 implements step A and step B in the present disclosure, it should be understood that step A and step B may also be jointly or separately implemented by two different processors 242 (e.g., the first processor implements step A and the second processor implements step B, or the first and second processors jointly implement step A and step B).

Figure 2A:
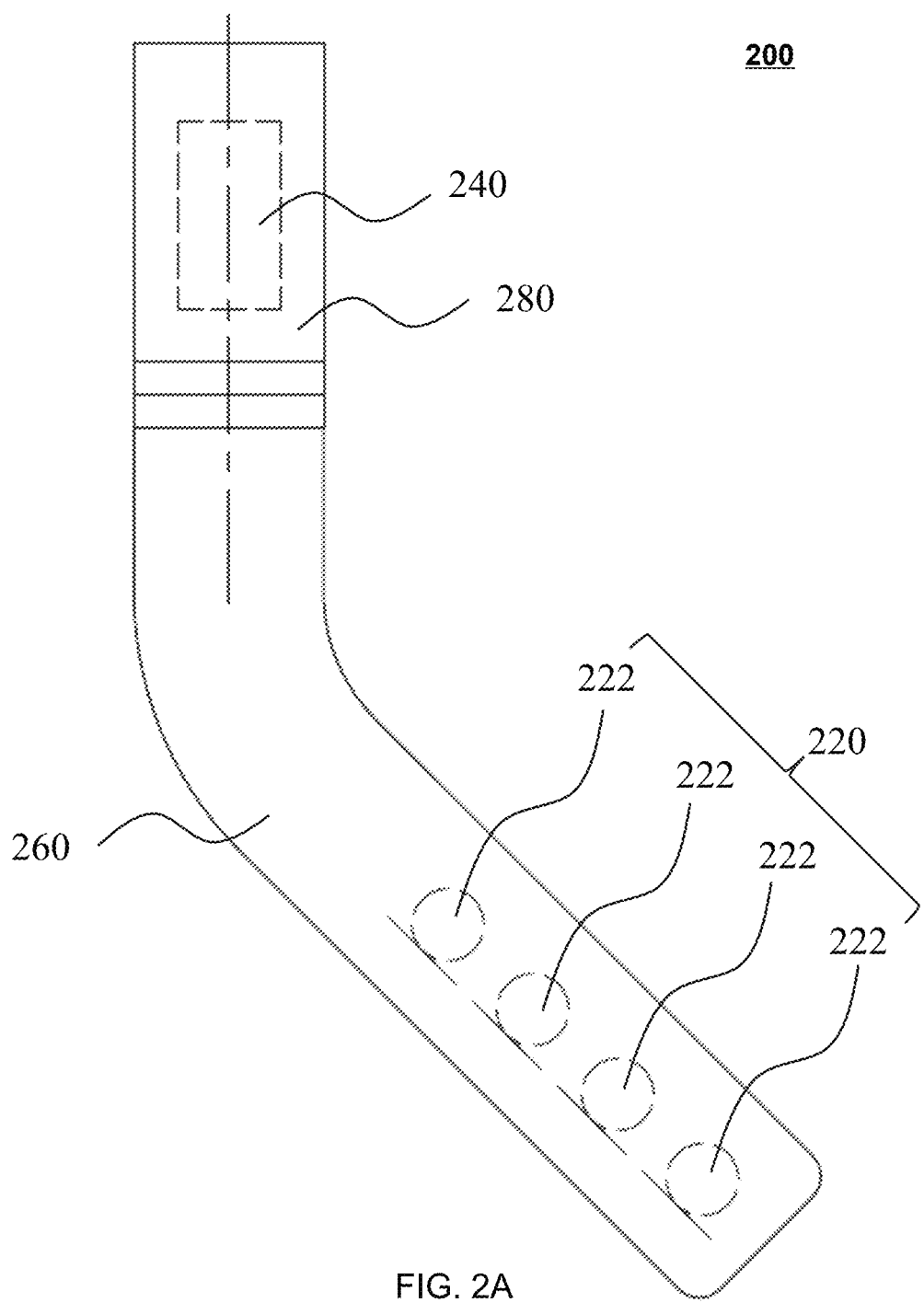
FIG. 2A is a schematic diagram illustrating an explosive structure of an electronic device according to some embodiments of the present disclosure.

FIG. 2A is a schematic diagram illustrating an explosive structure of an electronic device 200 according to some embodiments of the present disclosure. As shown in FIG. 2A, the electronic device 200 may include a microphone array 220, a computing device 240, a first housing 260, and a second housing 280.

The first housing 260 may be a mounting base of the microphone array 220. The microphone array 220 may be mounted inside the first housing 260. A shape of the first housing 260 may be adaptively designed according to a distribution shape of the microphone array 22, which is not limited in the present disclosure. The second housing 280 may be a mounting base of the computing device 240. The computing device 240 may be mounted inside the second housing 280. A shape of the second housing 280 may be adaptively designed according to a shape of the computing device 240, which is not limited in the present disclosure. When the electronic device 200 is a headphone, the second housing 280 may be connected to a wearable part. The second housing 280 may be connected to the first housing 260. As mentioned above, the microphone array 220 may be electrically connected to the computing device 240. Specifically, the microphone array 220 may be electrically connected to the computing device 240 through a connection between the first housing 260 and the second housing 280.

In some embodiments, the first housing 260 may be fixedly connected to the second housing 280, e.g., through integrated forming, welding, riveting, gluing, or the like. In some embodiments, the first housing 260 may be detachably connected to the second housing 280. The computing device 240 may be in communication connection with different microphone arrays 220. Specifically, the different microphone arrays 220 may have different counts of microphones 222, different array shapes, different distances between adjacent microphones 222, different mounting angles of the microphone arrays 220 in the first housing 260, and different mounting positions of the microphone arrays 220 in the first housing 260, etc. A user may change the corresponding microphone arrays 220 according to different application scenarios, to make the electronic device 200 applicable to a wider range of scenarios. For example, when a distance between the user and the electronic device 200 is relatively small in an application scenario, the user may use the microphone array 220 with a smaller distance between adjacent microphones 222. As another example, when the distance between the user and the electronic device 200 is relatively small in the application scenario, the user may use the microphone array 220 with a larger distance between adjacent microphones 222 and a larger count of microphones, etc.

The detachable connection may be any form of physical connection, such as a screw connection, a buckle connection, a magnetic suction connection, or the like. In some embodiments, the detachable connection between the first housing 260 and the second housing 280 may be the magnetic suction connection. That is, the detachable connection between the first housing 260 and the second housing 280 may be achieved through an adsorption force of a magnetic device.

Figure 2B:
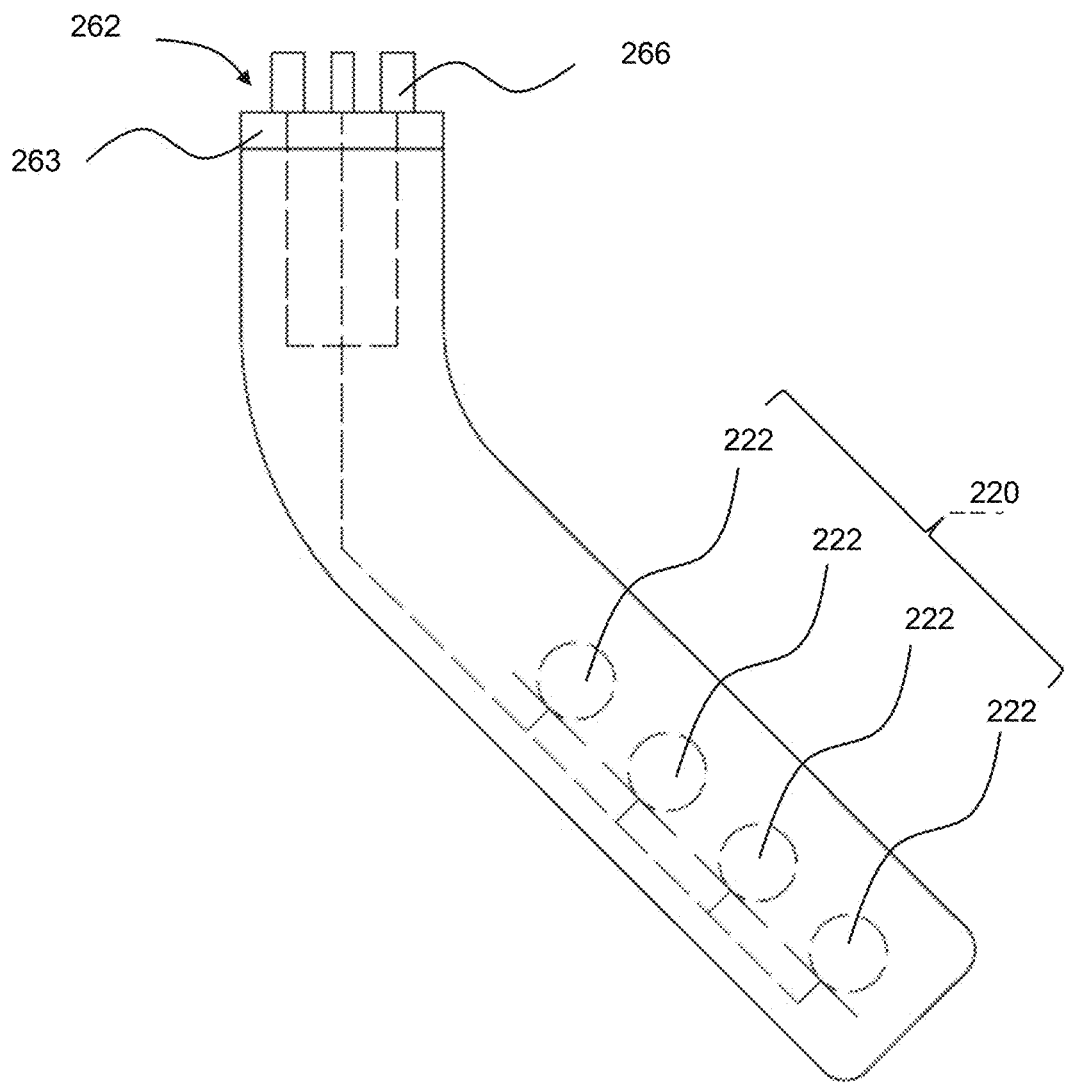
FIG. 2B illustrates a front view of a first housing according to some embodiments of the present disclosure.
Figure 2C:
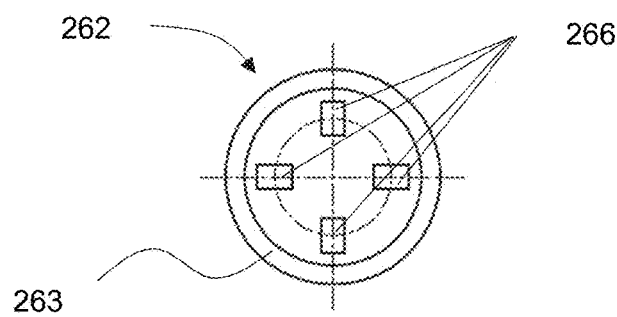
FIG. 2C illustrates a top view of a first housing according to some embodiments of the present disclosure.

FIG. 2B illustrates a front view of the first housing 260 according to the embodiments of the present disclosure; FIG. 2C illustrates a top view of the first housing 260 according to the embodiments of the present disclosure. As shown in FIG. 2B and FIG. 2C, the first housing 260 may include a first interface 262. In some embodiments, the first housing 260 may further include one or more contact points 266. In some embodiments, the first housing 260 may further include an angle sensor (not shown in FIG. 2B and FIG. 2C).

The first interface 262 may be a mounting interface of the first housing 260 and the second housing 280. In some embodiments, the first interface 262 may be circular. The first interface 262 may be rotatably connected to the second housing 280. When the first housing 260 is mounted on the second housing 280, the first housing 260 may rotate relative to the second housing 280 to adjust an angle of the first housing 260 relative to the second housing 280, thereby adjusting an angle of the microphone array 220.

The first interface 262 may include a first magnetic device 263. The first magnetic device 263 may be disposed at a position of the first interface 262 close to the second housing 280. The first magnetic device 263 may generate a magnetic adsorption force, to achieve a detachable connection to the second housing 280. When the first housing 260 is close to the second housing 260, the first housing 260 may be quickly connected to the second housing 280 through the adsorption force. In some embodiments, after the first housing 260 is connected to the second housing 280, the first housing 260 may rotate relative to the second housing 280 to adjust the angle of the microphone array 220. When the first housing 260 rotates relative to the second housing 280, the connection between the first housing 260 and the second housing 280 may still be maintained under the action of the adsorption force.

In some embodiments, the first interface 262 may further include a first positioning device (not shown in FIG. 2B and FIG. 2C). The first positioning device may be a positioning step protruding outward, or a positioning hole extending inward. The first positioning device may cooperate with the second housing 280 to implement quick mounting of the first housing 260 and the second housing 280.

As shown in FIG. 2B and FIG. 2C, in some embodiments, the first housing 260 may further include one or more contact points 266. The one or more contact points 266 may be disposed at the first interface 262. The one or more contact points 266 may protrude outward from the first interface 262. The one or more contact points 266 may be elastically connected to the first interface 262. The one or more contact points 266 may be in communication connection with the M microphones 222 in the microphone array 220. The one or more contact points 266 may be made of elastic metal to implement data transmission. When the first housing 260 is connected to the second housing 280, the microphone array 220 may be in communication connection with the computing device 240 through the one or more contact points 266. In some embodiments, the one or more contact points 266 may be arranged in a circle. After the first housing 260 is connected to the second housing 280 and when the first housing 260 rotates relative to the second housing 280, the one or more contact points 266 may also rotate relative to the second housing 280 and remain the communication connection with the computing device 240.

In some embodiments, the first housing 260 may further include an angle sensor (not shown in FIG. 2B and FIG. 2C). The angle sensor may be in communication connection with the one or more contact points 266 to facilitate the communication connection with the computing device 240. The angle sensor may collect angle data of the first housing 260 to determine an angle of the microphone array 220 and provide reference data for a subsequent calculation of the speech presence probability.

Figure 2D:
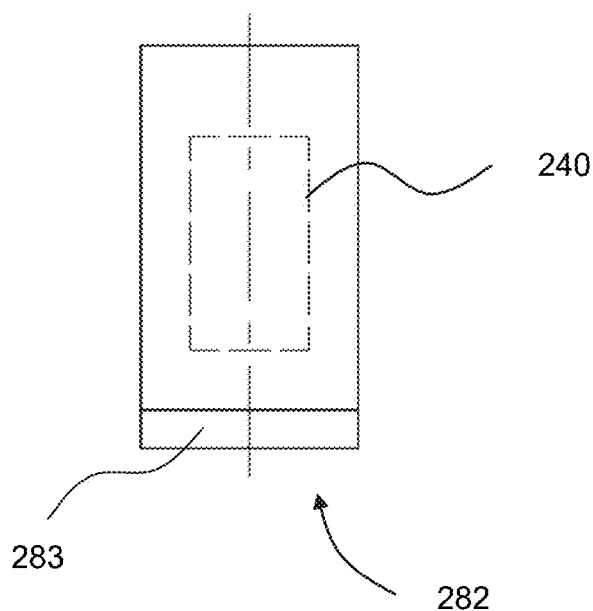
FIG. 2D illustrates a front view of a second housing according to some embodiments of the present disclosure.
Figure 2E:
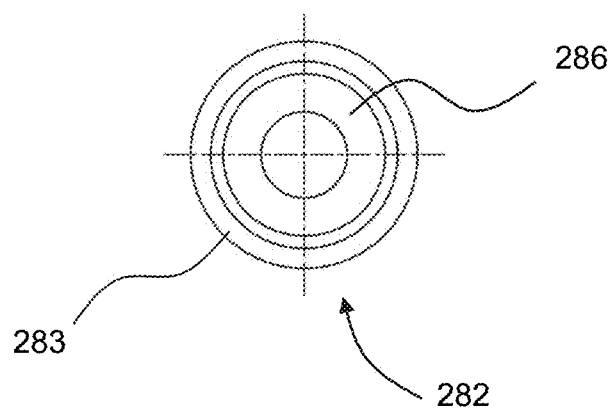
FIG. 2E illustrates a bottom view of a second housing according to some embodiments of the present disclosure.

FIG. 2D illustrates a front view of a second housing 280 according to some embodiments of the present disclosure; FIG. 2E illustrates a bottom view of a second housing 280 according to some embodiments of the present disclosure. As shown in FIG. 2D and FIG. 2E, the second housing 280 may include a second interface 282. In some embodiments, the second housing 280 may further include a guide rail 286.

The second interface 282 may be a mounting interface between the second housing 280 and the first housing 260. In some embodiments, the second interface 282 may be circular. The second interface 282 may be rotatably connected to the first interface 262 of the first housing 260. When the first housing 260 is mounted on the second housing 280, the first housing 260 may rotate relative to the second housing 280 to adjust an angle of the first housing 260 relative to the second housing 280, thereby adjusting an angle of the microphone array 220.

The second interface 282 may include a second magnetic device 283. The second magnetic device 283 may be disposed at a position of the second interface 282 close to the first housing 260. The second magnetic device 283 may generate a magnetic adsorption force to implement a detachable connection to the first interface 262. The second magnetic device 283 may cooperate with the first magnetic device 263. When the first housing 260 is close to the second housing 260, the first housing 260 may be quickly mounted on the second housing 280 through the adsorption force between the second magnetic device 283 and the first magnetic device 263. When the first housing 260 is mounted on the second housing 260, a position of the second magnetic device 283 may be opposite to a position of the first magnetic device 263. In some embodiments, after the first housing 260 is connected to the second housing 280, the first housing 260 may rotate relative to the second housing 280 to adjust the angle of the microphone array 220. When the first housing 260 rotates relative to the second housing 280, the connection between the first housing 260 and the second housing 280 may still be maintained under the action of the adsorption force.

In some embodiments, the second interface 282 may further include a second positioning device (not shown in FIG. 2D and FIG. 2E). The second positioning device may be a positioning step protruding outward, or a positioning hole extending inward. The second positioning device may cooperate with the first positioning device of the first housing 260 to implement quick mounting of the first housing 260 and the second housing 280. When the first positioning device is the positioning step, the second positioning device may be the positioning hole. When the first positioning device is the positioning hole, the second positioning device may be the positioning step.

As shown in FIG. 2D and FIG. 2E, in some embodiments, the second housing 280 may further include a guide rail 286. The guide rail 286 may be mounted at the second interface 282. The guide rail 286 may be in communication connection with the computing device 240. The guide rail 286 may be made of metal to implement data transmission. When the first housing 260 is connected to the second housing 280, the one or more contact points 266 may contact the guide rail 286 to form a communication connection, thereby achieving the communication connection between the microphone array 220 and the computing device 240, then implementing data transmission. As mentioned above, the one or more contact points 266 may be elastically connected to the first interface 262. In such cases, after the first housing 260 is connected to the second housing 280, the one or more contact points 266 may be completely contacted to the guide rail 286 under the elastic force of the elastic connection, thereby implementing a reliable communication connection. In some embodiments, the guide rail 286 may be arranged in a circle. After the first housing 260 is connected to the second housing 280 and when the first housing 260 rotates relative to the second housing 280, the one or more contact points 266 may also rotate relative to the guide rail 286 and maintain the communication connection with the guide rail 286.

Figure 3:
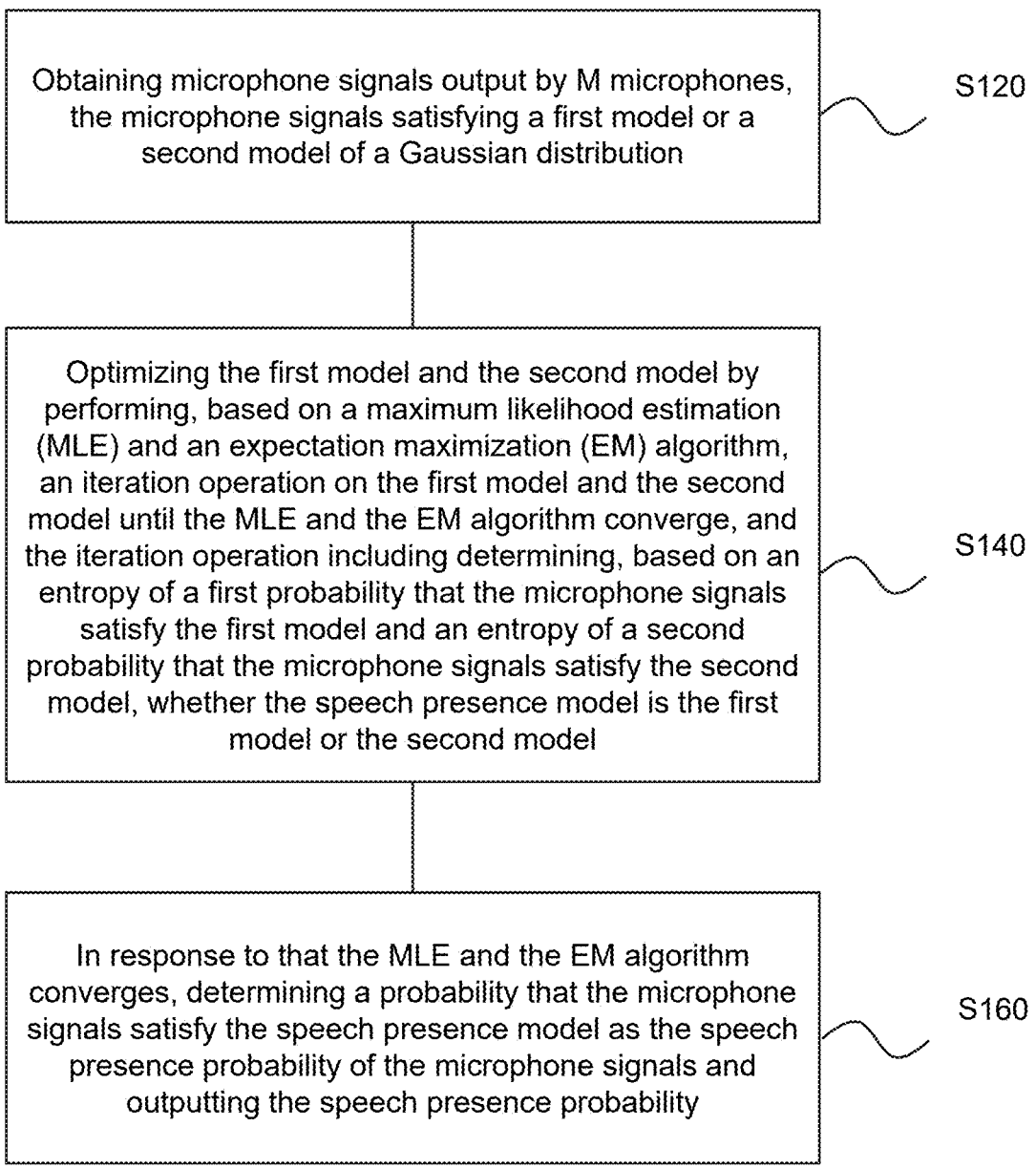
FIG. 3 is a flowchart illustrating a method for determining a speech presence probability according to some embodiments of the present disclosure.

FIG. 3 is a flowchart illustrating a method P100 for determining a speech presence probability according to some embodiments of the present disclosure. The method P100 may determine the speech presence probability of microphone signals. Specifically, a processor 242 may perform the method P100. As shown in FIG. 3, the method P100 may include the following operations.

In S120, microphone signals output by M microphones 222 may be obtained.

As mentioned above, each microphone 222 may output a corresponding microphone signal. The M microphones 222 may correspond to M microphone signals. When the method P100 is performed to determine the speech presence probability, the determination may be performed based on all the microphone signals of the M microphone signals, or based on part of the microphone signals. Therefore, the microphone signals may include M microphone signals of the M microphone signals or part of the microphone signals. The following description of the present disclosure will take the microphone signals including the M microphone signals corresponding to the M microphone signals as an example.

As mentioned above, the microphones 222 may collect noise in the surrounding environment, and may also collect a target voice of a target user. Assuming that there are N signal sources (i.e., $s_1(t) \ldots s_N(t)$) around the microphones 222. For the convenience of description, the N signal sources are defined as $s^v(t) \ldots s^v(t)$ is a signal source vector composed of the N signal sources $s_1(t), \ldots s_N(t)$, where v=n or s+n. v=n denotes that all the N signal sources $s^v(t)$ are noise signals. v=s+n denotes that the N signal sources $s^v(t)$ include the noise signals and target voice signals. A sound field mode of the N signal sources $s^v(t)$ may be a far-field mode. The N signal sources $s^v(t)$ may be regarded as plane waves. For the convenience of description, the microphone signals at time t may be denoted as x(t). The microphone signals x(t) may be a signal vector composed of the M microphone signals. Then the microphone signals x(t) may be expressed as the following equation:

$$x(t) = \begin{bmatrix} x_1^v(t) \\ \vdots \\ x_M^v(t) \end{bmatrix} = \begin{bmatrix} a_1^v(\theta_1) & \cdots & a_1^v(\theta_N) \\ \vdots & \ddots & \vdots \\ a_M^v(\theta_1) & \cdots & a_M^v(\theta_N) \end{bmatrix} \begin{bmatrix} s_1(t) \\ \vdots \\ s_N(t) \end{bmatrix} = a^v(\theta)s^v(t), \quad (1)$$

where $a^v(\theta)$ is a guidance vector of the N signal sources $s^v(t)$, $\theta_1, \ldots \theta_N$ are incident angles between the N signal sources $s_1(t) \ldots s_N(t)$ and the microphones 222, respectively, $a^v(\theta)$ is a function related to $\theta_1, \ldots \theta_N$ and distances $d_1 \ldots d_{M-1}$ between adjacent microphones 222. The computing device 240 may pre-store relative positional relationships of the M microphones 222, such as relative distances or relative coordinates. That is, the computing device 240 may pre-store $d_1 \ldots d_{M-1}$.

The microphone signals x(t) may be time domain signals. In some embodiments, in S120, the computing device 240 may also perform a frequency spectrum analysis on the microphone signals x(t). Specifically, the computing device 240 may obtain frequency domain signals $x_{f,t}$ of the microphone signals by performing a Fourier transform based on the time domain signals x(t) of the microphone signals. The microphone signals in a frequency domain will be described in the following description. Then the microphone signals $x_{f,t}$ may be expressed as the following equation:

$$x_{f,t} = a_f^v(\theta)s_{f,t}^v, \quad (2)$$

where $$a_f^v(\theta)$$

is a guidance vector in the frequency domain, $$s_{f,t}^v$$

is a signal complex amplitude corresponding to the N signal sources in the frequency domain. In some embodiments, the N signal sources $$s_{f,t}^v$$

may satisfy a Gaussian distribution.

$$s_{f,t}^v$$

may be expressed as the following equation:

$$s_{f,t}^v \sim N(0, \varphi_{f,t}^v). \quad (3)$$

In some embodiments, the Gaussian distribution $$N(0, \varphi_{f,t}^v)$$

may be a complex Gaussian distribution, where $$\varphi_{f,t}^v$$

is a variance of $$s_{f,t}^v.$$

When $$v = n, s_{f,t}^n$$

is a speech absence model satisfying the Gaussian distribution. When v=s+n, $$s_{f,t}^{s+n}$$

is a speech presence model satisfying the Gaussian distribution. The variance $$\varphi_{f,t}^n$$

of the speech absence model when v=n is different from the variance $$\varphi_{f,t}^{s+n}$$

of the speech presence model when v=s+n.

According to equation (2) and equation (3), the microphone signals $x_{f,t}$ may also satisfy the Gaussian distribution. Specifically, the microphone signals $x_{f,t}$ may be the speech presence model or the speech absence model that satisfies the Gaussian distribution. $x_{f,t}$ may be expressed as the following equation:

$$x_{f,t} \sim N(0, \varphi_{f,t}^v R_f^v), \quad (45)$$

where $$\varphi_{f,t}^v R_f^v$$

is the variance of $x_{f,t}$, $$R_f^v = a_f^v(\theta) a_f^v(\theta)^H$$

For the convenience of description, $$R_f^v$$

is defined as a spatial covariance matrix. When v=n, $x_{f,t}$ is the speech absence model that satisfies the Gaussian distribution. When v=s+n, $x_{f,t}$ is the speech presence model that satisfies the Gaussian distribution.

The speech presence probability corresponding to the microphone signals $x_{f,t}$ may be a probability that the microphone signals $x_{f,t}$ belong to the speech presence model. For the convenience of description, the speech presence probability corresponding to the microphone signals $x_{f,t}$ may be defined as $$\lambda_{f,t}^{s+n},$$

and the speech absence probability corresponding to the microphone signals $x_{f,t}$ may be defined as $$\lambda_{f,t}^n = 1 - \lambda_{f,t}^{s+n}.$$

A speech presence distribution probability corresponding to the microphone signals $x_{f,t}$ in the speech presence model may be defined as $$P_{s+n} = N(x_{f,t}|0, \varphi_{f,t}^{s+n} R_f^{s+n}).$$

A speech presence distribution probability corresponding to the microphone signals $x_{f,t}$ in the speech absence model may be defined as $$p_n = N(x_{f,t}|0, \varphi_{f,t}^n R_f^n).$$

The speech presence probability $$\lambda_{f,t}^{s+n}$$

corresponding to the microphone signals $x_{f,t}$ may be expressed as the following equation:

$$\lambda_{f,t}^{s+n} = \frac{p_{s+n}}{p_{s+n} + p_n}.$$

(5)

To determine $$\lambda_{f,t}^{s+n},$$

the computing device 240 may determine a speech presence variance $$\varphi_{f,t}^{s+n} R_f^{s+n}$$

corresponding to the speech presence model and a speech absence variance $$\varphi_{f,t}^n R_f^n$$

corresponding to the speech absence model. It is assumed that the microphone signals $x_{f,t}$ is a first model or a second model that satisfies the Gaussian distribution. One of the first model and the second model may be the speech presence model, and the other of the first model and the second model may be the speech absence model.

For the convenience of description, the first model may be defined as the following equation:

$$N_1(0, \varphi^v_{1,f,t} R^v_{1,f}), \quad (6)$$

where $$\varphi^v_{1,f,t} R^v_{1,f}$$

is a first variance of the Gaussian distribution corresponding to the first model. The first variance $$\varphi^v_{1,f,t} R^v_{1,f}$$

is a product of a first parameter $$\varphi^v_{1,f,t}$$

and a first spatial covariance matrix $$R^v_{1,f}.$$

The second model is defined as the following equation:

$$N_2(0, \varphi^v_{2,f,t} R^v_{2,f}), \quad (7)$$

where $$\varphi^v_{2,f,t} R^v_{2,f}$$

is a second variance of the Gaussian distribution corresponding to the second model. The second variance $$\varphi^v_{2,f,t} R^v_{2,f}$$

is a product of a second parameter $$\varphi^v_{2,f,t}$$

and a second spatial covariance matrix $$R^v_{2,f}.$$

To determine the $$\lambda^{s+n}_{f,t},$$

the computing device 240 may determine which of the first model and the second model is the speech presence model and which of the first model and the second model is the speech absence model.

In S140: the first model and the second model may be optimized by performing, based on the MLE and the EM algorithm, an iteration operation on the first model and the second model until the MLE and the EM algorithm converge.

The computing device 240 may obtain a first variance $$\varphi^v_{1,f,t} R^v_{1,f}$$

of the first model and a second variance $$\varphi^v_{2,f,t} R^v_{f2}$$

of the second mouth by performing an iterative operation on the first model and the second model using an iterative optimization manner. In the iterative operation, the computing device 240 may determine whether the speech presence model is the first model or the second model based on an entropy $$\text{entropy}(\lambda^1_{f,t})$$

of a first probability $$\lambda^1_{f,t}$$

that the microphone signals $x_{f,t}$ satisfy the first model and an entropy $$\text{entropy}(\lambda^2_{f,t})$$

of a second probability $$\lambda^2_{f,t}$$

that the microphone signal $x_{f,t}$ satisfy the second model. The first probability $$\lambda^1_{f,t}$$

may be a probability that the microphone signals $x_{f,t}$ belong to the first model. The second probability $$\lambda_{f,t}^2$$

may be a probability that the microphone signals $x_{f,t}$ belong to the second model. The first probability $$\lambda_{f,t}^1$$

and the second probability $$\lambda_{f,t}^2$$

may be complementary, i.e., $$1 = \lambda_{f,t}^1 + \lambda_{f,t}^2.$$

A first distribution probability corresponding to the microphone signals $x_{f,t}$ in the first model may be defined as $$p_1 = N_1(x_{f,t} \mid 0, \varphi_{1,f,t}^v R_{1,f}^v).$$

second distribution probability corresponding to the microphone signals $x_{f,t}$ in the second model may be defined as $$p_2 = N_2(x_{f,t} \mid 0, \varphi_{2,f,t}^v R_{2,f}^v).$$

The first probability $$\lambda_{f,t}^1$$

corresponding to the microphone signals $x_{f,t}$ may be expressed as the following equation:

$$\lambda_{f,t}^1 = \frac{p_1}{p_1 + p_2} = \frac{N_1(x_{f,t} \mid 0, \varphi_{1,f,t}^v R_{1,f}^v)}{N_1(x_{f,t} \mid 0, \varphi_{1,f,t}^v R_{1,f}^v) + N_2(x_{f,t} \mid 0, \varphi_{2,f,t}^v R_{2,f}^v)}. \quad (8)$$

The second probability $$\lambda_{f,t}^2$$

corresponding to the microphone signals $x_{f,t}$ may be expressed as the following equation:

$$\lambda_{f,t}^2 = \frac{p_2}{p_1 + p_2} = 1 - \lambda_{f,t}^1. \quad (9)$$

Figure 4:
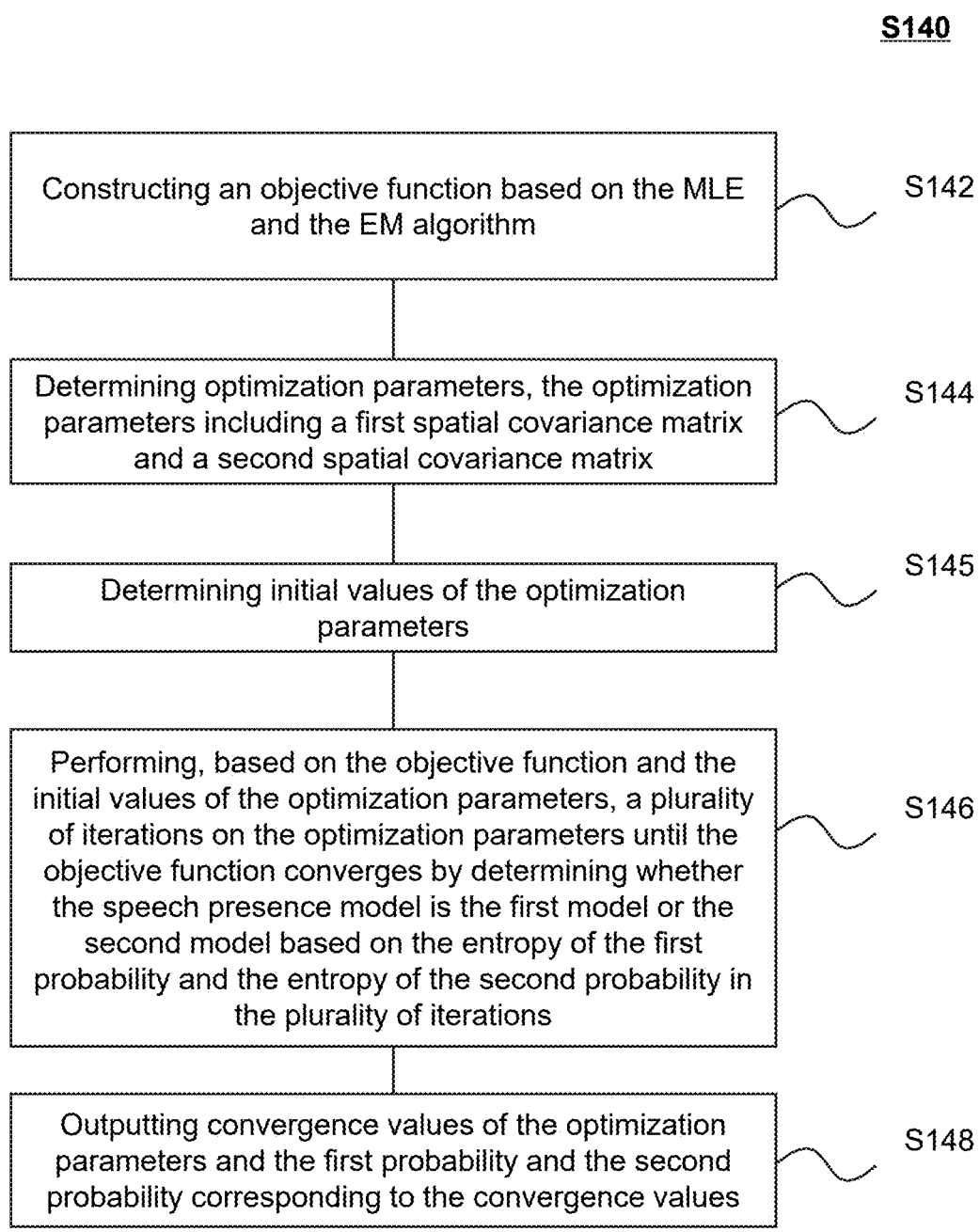
FIG. 4 is a flowchart illustrating an iterative optimization according to some embodiments of the present disclosure.

FIG. 4 is a flowchart illustrating an iterative optimization according to some embodiments of the present disclosure.

FIG. 4 illustrates S140. As shown in FIG. 4, S140 may include the following operations.

In S142: an objective function may be constructed based on the MLE and the EM algorithm.

As mentioned before, unknown parameters may include the first variance $$\varphi_{1,f,t}^v R_{1,f}^v$$

of the first model and the second variance $$\varphi_{2,f,t}^v R_{2,f}^v$$

of the second model. Hidden variables may include a first probability $$\lambda_{f,t}^1$$

that the microphone signals $x_{f,t}$ belong to the first model and a second probability $$\lambda_{f,t}^2$$

that the microphone signals $x_{f,t}$ belong to the second model. In such cases, the first variance $$\varphi_{1,f,t}^v R_{1,f}^v$$

of the first model and the second variance $$\varphi_{2,f,t}^v R_{2,f}^v$$

of the second model may be optimized by performing an iteration operation on the first variance $$\varphi_{1,f,t}^v R_{1,f}^v$$

and the second variance $$\varphi_{2,f,t}^v R_{2,f}^v$$

using the MLE and the algorithm. The objective function may be an MLE function. The MLE function may be expressed as the following equation:

$$lnL(\varphi_{1,f,t}^v R_{1,f}^v, \varphi_{2,f,t}^v R_{2,f}^v) = \sum_{f,t} \sum_{i=1}^{2} \lambda_{f,t}^i lnN_i(x_{f,t} \mid \varphi_{i,f,t}^v R_{i,f}^v). \quad (10)$$

In S144, optimization parameters may be determined. A relationship between the first parameter $$\varphi^v_{1,f,t}$$

and the first spatial covariance matrix $$R^v_{1,f}$$

may be expressed as the following equation:

$$\varphi^v_{1,f,t} = \frac{1}{M} tr(x_{f,t} x^H_{f,t} R^{v\,-1}_{1,f}). \qquad (11)$$

A relationship between the second parameter $$\varphi^v_{2,f,t}$$

and the second spatial covariance matrix $$R^v_{2,f}$$

may be expressed as the following equation:

$$\varphi^v_{2,f,t} = \frac{1}{M} tr(x_{f,t} x^H_{f,t} R^{v\,-1}_{2,f}). \qquad (12)$$

In such cases, the optimization parameters may include the first spatial covariance matrix and the second spatial covariance matrix.

In S145: initial values of the optimization parameters may be determined.

For the convenience of description, the initial value of the first spatial covariance matrix $$R^v_{1,f}$$

may be defined as $$R^v_{10,f},$$

and the initial value of the second spatial covariance matrix $$R^v_{2,f}$$

may be defined as $$R^v_{20,f}.$$

The initial value $$R^v_{10,f}$$

of the first spatial covariance matrix $$R^v_{1,f}$$

and the initial value $$R^v_{20,f}$$

of the second spatial covariance matrix $$R^v_{2,f}$$

may be the same of different. In some embodiments, the initial value $$R^v_{10,f}$$

of the first spatial covariance matrix $$R^v_{1,f}$$

and/or the initial value $$R^v_{20,f}$$

of the second spatial covariance matrix $$R^v_{1,f}$$

may be an identity matrix $I_N$. In some embodiments, the initial value $$R^v_{10,f}$$

of the first spatial covariance matrix $$R^v_{1,f}$$

and/or the initial value $$R^v_{20,f}$$

of the second spatial covariance matrix $$R_{2,f}^v$$

may be directly determined based on several adjacent frames of microphone signals. Then $$R_{10,f}^v$$

and/or $$R_{20,f}^v$$

may be expressed as the following equation:

$$R_{10,f}^v = \frac{1}{L}\sum_{t=1}^{L} x_{f,t} x_{f,t}^H. \qquad (13)$$

In S146: a plurality of iterations may be performed on the optimization parameters based on the objective function and the initial values of the optimization parameters until the objective function converges.

As mentioned above, the computing device 240 may determine whether the speech presence model is the first model or the second model based on the entropy $$\text{entropy}\,(\lambda_{f,t}^1)$$

of the first probability $$\lambda_{f,t}^1$$

and the entropy $$\text{entropy}\,(\lambda_{f,t}^2)$$

of the second probability $$\lambda_{f,t}^2$$

in the plurality of the iterations.

Figure 5:
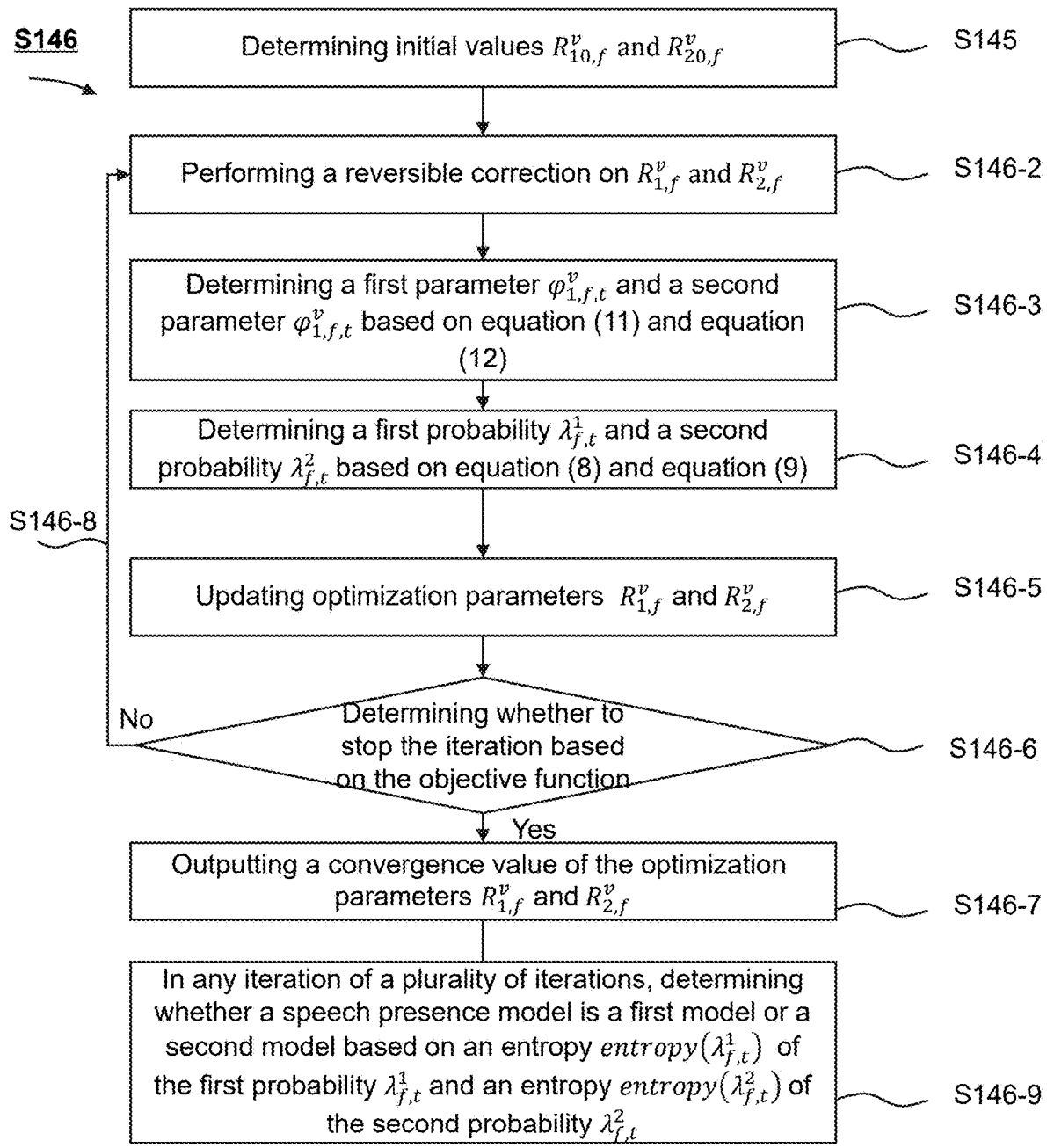
FIG. 5 is a flowchart illustrating a plurality of iterations according to some embodiments of the present disclosure.

In some embodiments, the computing device 240 may determine whether the speech presence model is the first model or the second model based on the entropy $$\text{entropy}\,(\lambda_{f,t}^1)$$

of the first probability $$\lambda_{f,t}^1$$

and the entropy $$\text{entropy}\,(\lambda_{f,t}^2)$$

of the second probability $$\lambda_{f,t}^2$$

in any literation of the plurality of iterations, as shown in FIG. 5. FIG. 5 is a flowchart illustrating a plurality of iterations according to some embodiments of the present disclosure, which may correspond to S146. As shown in FIG. 5, S146 may be included in each iteration.

In S146-2: a reversible correction may be performed on the optimization parameters.

Specifically, in S146-2, in response to determining that the optimization parameters are irreversible, the optimization parameters may be corrected based on a deviation matrix. The deviation matrix may include one of an identity matrix, or a random matrix obeying a normal distribution or a uniform distribution. As mentioned above, the optimization parameters may include a first spatial covariance matrix $$R_{1,f}^v$$

and a second spatial covariance matrix $$R_{2,f}^v.$$

According to equation (11) and equation (12), the first spatial covariance matrix $$R_{1,f}^v$$

and the second spatial covariance matrix $$R_{2,f}^v$$

may be invertible to obtain the first parameter $$\varphi_{1,f,t}^v$$

and the second parameter $$\varphi_{2,f,t}^v.$$

The larger the condition number of a matrix, the closer the matrix is to a singular matrix (i.e., an irreversible matrix). When the first spatial covariance matrix $$R_{1,f}^v$$

or the second spatial covariance matrix $$R_{2,f}^v$$

is irreversible (i.e., the condition number of the matrix is greater than a certain threshold η), the correction may be performed by adding a slight disturbance to the first spatial covariance matrix $$R_{1,f}^v$$

or the second spatial covariance matrix $$R_{2,f}^v$$

such that the first spatial covariance matrix or the second spatial covariance matrix may be reversible.

Specifically, the computing device 240 may determine whether the first spatial covariance matrix $$R_{1,f}^v$$

and the second spatial covariance matrix $$R_{2,f}^v$$

is reversible. If $$cond(R_{1,f}^v) > \eta$$

or $$cond(R_{2,f}^v) > \eta,$$

which represents that the first spatial covariance matrix $$R_{1,f}^v$$

or the second spatial covariance matrix $$R_{2,f}^v$$

is irreversible, a reversible correction may be performed on the first spatial covariance matrix $$R_{1,f}^v$$

or the second spatial covariance matrix $$R_{2,f}^v,$$

wherein η is a threshold relating to the condition number of the matrix. In some embodiments, η=10000. In some embodiments, n may be larger or smaller.

When the first spatial covariance matrix $$R_{1,f}^v$$

or the second spatial covariance matrix $$R_{2,f}^v$$

is irreversible, the first spatial covariance matrix $$R_{1,f}^v$$

or the second spatial covariance matrix $$R_{2,f}^v$$

may be corrected using the deviation matrix Q. The first spatial covariance matrix $$R_{1,f}^v$$

or the second spatial covariance matrix $$R_{2,f}^v$$

may be expressed as the following equation:

$$R_{1,f}^v = R_{1,f}^v + \mu Q, \tag{14}$$

$$R_{2,f}^v = R_{2,f}^v + \mu Q, \tag{15}$$

where Q is the deviation matrix, μ is a coefficient of deviation. In some embodiments, μ=0.001.

When both the first spatial covariance matrix $$R_{1,f}^v$$

and the second spatial covariance matrix $$R_{2,f}^v$$

are reversible, the correction may not be performed.

In S146-3: the first parameter $$\varphi_{1,f,t}^v$$

and the second parameter $$\varphi_{2,f,t}^v$$

may be determined based on equation (11) and equation (12).

In S146-4: the first probability $$\lambda_{f,t}^1$$

and the second probability $$\lambda_{f,t}^2$$

may be determined based on equation (8) and equation (9).

In S146-5: the first spatial covariance matrix $$R_{1,f}^v$$

and the second spatial covariance matrix $$R_{2,f}^v$$

of the optimization parameters may be updated based on the first probability $$\lambda_{f,t}^1$$

and the second probability $$\lambda_{f,t}^2.$$

The first spatial covariance matrix $$R_{1,f}^v$$

and the second spatial covariance matrix $$R_{2,f}^v$$

may be expressed as the following equation:

$$R_{1,f}^v = \frac{1}{\sum_t \lambda_{f,t}^1} \sum_t \lambda_{f,t}^1 \frac{1}{\varphi_{1,f,t}^v} x_{f,t} x_{f,t}^H, \quad (16)$$

$$R_{2,f}^v = \frac{1}{\sum_t \lambda_{f,t}^2} \sum_t \lambda_{f,t}^2 \frac{1}{\varphi_{2,f,t}^v} x_{f,t} x_{f,t}^H, \quad (17)$$

In S146-6: whether to stop the iteration may be determined based on the objective function.

S146-6 may include the following operations.

In S146-7: in response to determining to stop the iteration, convergence values of the optimization parameters may be output.

In S146-8: in response to determining not to stop the iteration, a next iteration may be performed.

As shown in FIG. 5, S146 may further include the following operations.

In S146-9, in any iteration of the plurality of iterations, whether the speech presence model is the first model or the second model may be determined based on the entropy $$\text{entropy}\left(\lambda_{f,t}^1\right)$$

of the first probability $$\lambda_{f,t}^1$$

and the entropy $$\text{entropy}\left(\lambda_{f,t}^2\right)$$

of the second probability $$\lambda_{f,t}^2.$$

S146-9 may be performed during the iteration, or after the iteration is finished to determine the entropy $$\text{entropy}\left(\lambda_{f,t}^1\right)$$

of the first probability $$\lambda_{f,t}^1$$

and the entropy $$\text{entropy}(\lambda_{f,t}^2)$$

of the second probability $$\lambda_{f,t}^2$$

using the first probability $$\lambda_{f,t}^1$$

and the second probability $$\lambda_{f,t}^2$$

in any iteration of the plurality of iterations as calculation parameters, such that whether the speech presence model is the first model or the second model may be determined. The entropy may represent a degree of chaos or disorder of a system. The more disordered the system, the greater the entropy value; and the more ordered the system, the lower the entropy value. The N signal sources being all noise signals may be more disordered than the N signal sources including voice signals. In such cases, the entropy of the speech absence model may be greater than the entropy of the speech presence model.

Specifically, in S146-9, the computing device 240 may obtain the first probability $$\lambda_{f,t}^1$$

and the second probability $$\lambda_{f,t}^2$$

in any iteration, and calculate the entropy $$\text{entropy}(\lambda_{f,t}^1)$$

of the first probability $$\lambda_{f,t}^1$$

and the entropy $$\text{entropy}(\lambda_{f,t}^2)$$

of the second probability $$\lambda_{f,t}^2.$$

When the entropy $$\text{entropy}(\lambda_{f,t}^1)$$

of the first probability $$\lambda_{f,t}^1$$

is greater than the $$\text{entropy}(\lambda_{f,t}^2)$$

of the second probability $$\lambda_{f,t}^2,$$

the computing device 240 may determine that the speech presence model is the second model, and the first model is the speech absence model. When the entropy $$\text{entropy}(\lambda_{f,t}^1)$$

of the first probability $$\lambda_{f,t}^1$$

is smaller than the entropy $$\text{entropy}(\lambda_{f,t}^2)$$

of the second probability $$\lambda_{f,t}^2,$$

the computing device 240 may determine that the speech presence model is the first model, and the second model is the speech absence model.

Figure 6:
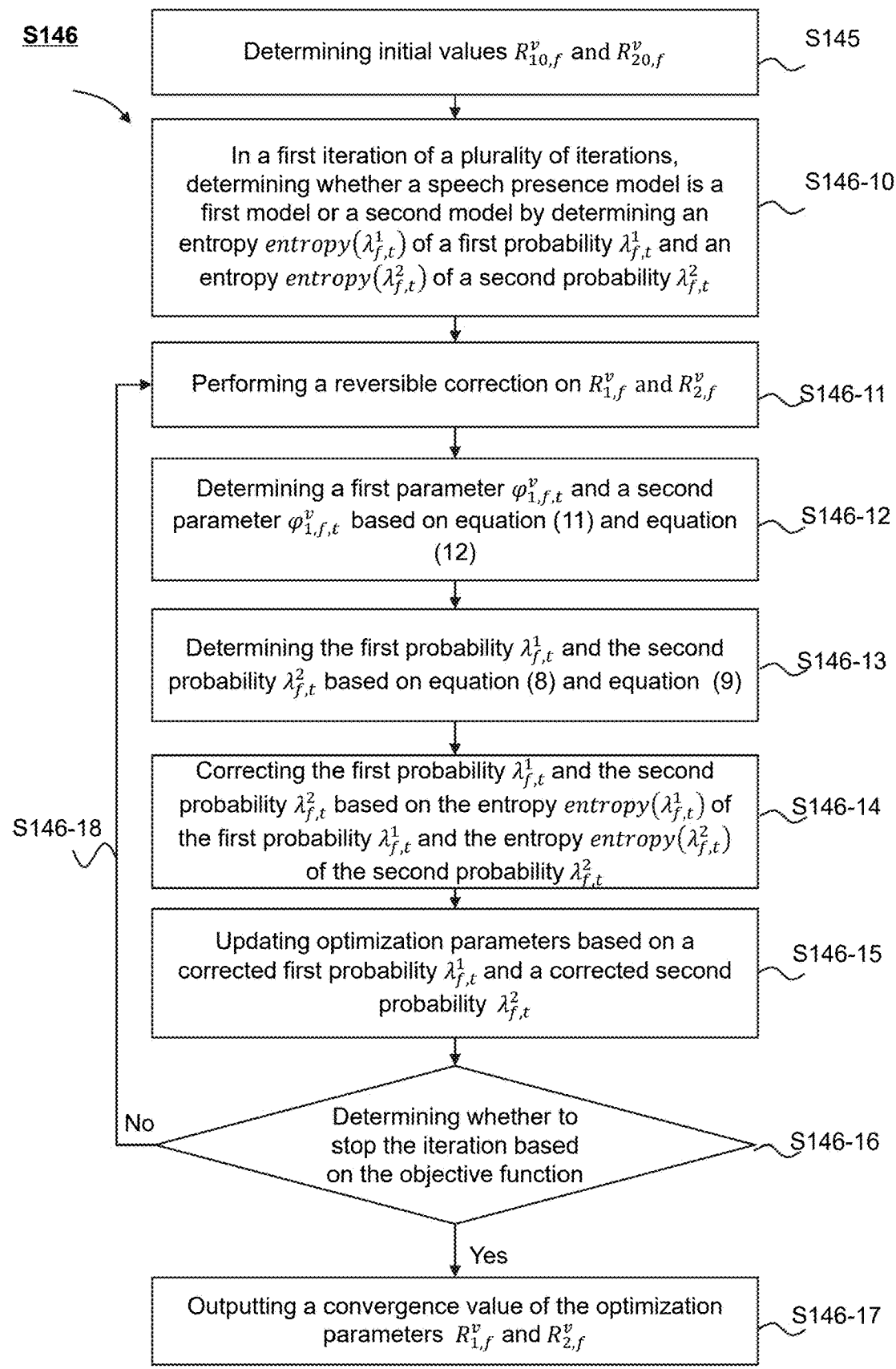
FIG. 6 is a flowchart illustrating another plurality of iterations according to some embodiments of the present disclosure.

In some embodiments, the computing device 240 may determine whether the speech presence model is the first model or the second model based on the entropy $$\text{entropy}(\lambda_{f,t}^1)$$

of the first probability $$\lambda_{f,t}^1$$

and the entropy $$\text{entropy}(\lambda_{f,t}^2)$$

of the second probability $$\lambda_{f,t}^2$$

in the first iteration of the plurality of iterations, and correct the first probability $$\lambda_{f,t}^1$$

and the second probability $$\lambda_{f,t}^2$$

in each iteration of the subsequent iterations so as to avoid misjudgment of the speech presence probability, as shown in FIG. 6. FIG. 6 is a flowchart illustrating another plurality of iterations according to some embodiments of the present disclosure, which corresponds to S146. As shown in FIG. 6, S146 may include the following operations.

In S146-10, in the first iteration of the plurality of iterations, whether the speech presence model is the first model or the second model may be determined by determining the entropy $$\text{entropy}(\lambda_{f,t}^1)$$

of the first probability $$\lambda_{f,t}^1$$

and the entropy $$\text{entropy}(\lambda_{f,t}^2)$$

of the second probability $$\lambda_{f,t}^2.$$

Specifically, in S146-1, the computing device 240 may determine the first parameter $$\varphi_{1,f,t}^v$$

and the second parameter $$\varphi_{2,f,t}^v$$

based on equation (11) and equation (12) in the first iteration; then determine the first probably $$\lambda_{f,t}^1$$

and the second probability $$\lambda_{f,t}^2$$

based on equation (8) and equation (9); and then calculate and compare the entropy $$\text{entropy}(\lambda_{f,t}^1)$$

of the first probability $$\lambda_{f,t}^1$$

and the entropy $$\text{entropy}(\lambda_{f,t}^2)$$

of the second $$\lambda_{f,t}^2.$$

When the entropy $$\text{entropy}(\lambda_{f,t}^1)$$

of the first probability $$\lambda_{f,t}^1$$

is greater than the entropy $$\text{entropy}(\lambda_{f,t}^2)$$

of the second probability $$\lambda_{f,t}^2,$$

the computing device 240 may determine that the speech presence model is the second model, and the first model is the speech absence model. When the entropy $$\text{entropy}\,(\lambda_{f,t}^1)$$

of the first probability $$\lambda_{f,t}^1$$

is smaller than the entropy $$\text{entropy}\,(\lambda_{f,t}^2)$$

of the second probability $$\lambda_{f,t}^2,$$

the computing device 240 may determine that the speech presence model is the first model, and the second model is the speech absence model.

As shown in FIG. 6, S146 may also include, in each iteration after the first iteration:

In S146-11: reversible correction may be performed on the optimization parameters as S146-2 mentioned above, which is not repeated here.

In S146-12: the first parameter $$\varphi_{1,f,t}^{y}$$

and the second parameter $$\varphi_{2,f,t}^{y}$$

may be determined based on equation (11) and equation (12).

In S146-13: the first probability and the second probability may be determined based on equation (8) and equation (9).

In S146-14: the first probability $$\lambda_{f,t}^1$$

and the second probability $$\lambda_{f,t}^2$$

may be corrected based on the entropy $$\text{entropy}\,(\lambda_{f,t}^1)$$

of the first probability $$\lambda_{f,t}^1$$

and the entropy $$\text{entropy}\,(\lambda_{f,t}^2)$$

of the second probability $$\lambda_{f,t}^2.$$

Specifically, S146-14 may include that the computing device 240 determines and compares the entropy $$\text{entropy}\,(\lambda_{f,t}^1)$$

of the first probability $$\lambda_{f,t}^1$$

and the entropy $$\text{entropy}\,(\lambda_{f,t}^2)$$

of the second probability $$\lambda_{f,t}^2.$$

When the speech presence model is the first model, and if the entropy $$\text{entropy}\,(\lambda_{f,t}^1)$$

of the first probability $$\lambda_{f,t}^1$$

is greater than the entropy $$\text{entropy}(\lambda_{f,t}^2)$$

of the second probability $$\lambda_{f,t}^2,$$

a value corresponding to the first probability $$\lambda_{f,t}^1$$

may be exchanged with a value corresponding to the second probability $$\lambda_{f,t}^2.$$

That is, the first probability $$\lambda_{f,t}^1$$

may be designated as a corrected second probability $$\lambda_{f,t}^2,$$

and the second probability $$\lambda_{f,t}^2$$

may be designated as a corrected first probability $$\lambda_{f,t}^1.$$

When the speech presence model is the first model, and if the entropy $$\text{entropy}(\lambda_{f,t}^1)$$

of the first probability $$\lambda_{f,t}^1$$

is smaller than the entropy $$\text{entropy}(\lambda_{f,t}^2)$$

of the second probability $$\lambda_{f,t}^2,$$

the first probability $$\lambda_{f,t}^1$$

and the second probability $$\lambda_{f,t}^2$$

may not be corrected. When the speech presence model is the second model, and if the entropy $$\text{entropy}(\lambda_{f,t}^1)$$

of the first probability $$\lambda_{f,t}^1$$

is smaller than the entropy $$\text{entropy}(\lambda_{f,t}^2)$$

of the second probability $$\lambda_{f,t}^2,$$

the value corresponding to the first probability $$\lambda_{f,t}^1$$

may be exchanged with the value corresponding to the second probability $$\lambda_{f,t}^2.$$

That is, the first probability $$\lambda_{f,t}^1$$

may be designated as a corrected second probability $$\lambda_{f,t}^2,$$

and the second probability $$\lambda_{f,t}^2$$

may be designated as a correct first probability $$\lambda_{f,t}^1.$$

presence model is the second model, and if the entropy $$\text{entropy}(\lambda_{f,t}^1)$$

of the first probability $$\lambda_{f,t}^1$$

is greater than the entropy $$\text{entropy}(\lambda_{f,t}^2)$$

of the second probability $$\lambda_{f,t}^2,$$

the first probability $$\lambda_{f,t}^1$$

and the second probability $$\lambda_{f,t}^2$$

may not be corrected.

In S146-15: the optimization parameters, the first spatial covariance matrix $$R_{1,f}^v,$$

and the second spatial covariance matrix $$R_{2,f}^v$$

may be updated based on the corrected first probability $$\lambda_{f,t}^1$$

and the corrected second probability $$\lambda_{f,t}^2.$$

In S146-14 and S146-15, the entropy of the speech presence model may be made smaller than the entropy of the speech absence model during each iteration such that each iteration may converge toward a target direction, thereby speeding up the convergence.

In S146-16: whether to stop the iteration may be determined based on the objective function.

S146-16 may include the following operations.

In S146-17: in response to determining to stop the iteration, convergence values of the optimization parameters may be output.

In S146-18: in response to determining not to stop the iteration, a next iteration may be performed.

As shown in FIG. 4, S140 may further include the following operations.

In S148: the convergence values of the optimization parameters and corresponding first probability $$\lambda_{f,t}^1$$

and second probability $$\lambda_{f,t}^2$$

may be output.

As mentioned above, when the objective function converges, the computing device 240 may output the value of the corresponding optimization parameter when the objective function converges as convergence values of the optimization parameters. Moreover, the computing device 240 may output the first probability $$\lambda_{f,t}^1$$

and the second probability $$\lambda_{f,t}^2$$

corresponding to the convergence values of the optimization parameters. As shown in equation (16) and equation (17), the first spatial covariance matrix $$R_{1,f}^v$$

and the second spatial covariance matrix $$R_{2,f}^v$$

of the optimization parameters may be determined based on the first probability $\lambda_{f,t}^1$ and the second probability $$\lambda_{f,t}^2.$$

When the objective function converges, the computing device 240 may output the first probability $$\lambda_{f,t}^1$$

corresponding to the first spatial covariance matrix $$R_{1,f}^v$$

and the second probability $$\lambda_{f,t}^2$$

corresponding to the second spatial covariance matrix $$R_{2,f}^v.$$

As shown in FIG. 3, the method P100 may further include the following operations.

In S160, when the MLE and the EM algorithm converge, a probability that the microphone signals $x_{f,t}$ satisfy the speech presence model may be determined as the speech presence probability $$\lambda_{f,t}^{s+n}$$

of the microphone signals $x_{f,t}$, and the probability may be output.

As mentioned above, in S140, the computing device 240 may determine whether the speech presence model is the first model or the second model based on the entropy $$\text{entropy } (\lambda_{f,t}^1)$$

of the first probability $$\lambda_{f,t}^1$$

and the entropy $$\text{entrophy } (\lambda_{f,t}^2)$$

of the entropy $$\lambda_{f,t}^2.$$

When the speech presence model is the first model, the probability that the microphone signals $x_{f,t}$ satisfy the speech presence model may be a first probability $$\lambda_{f,t}^1$$

that the microphone signals $x_{f,t}$ satisfy the first model. In such cases, the speech presence probability $$\lambda_{f,t}^{s+n}$$

of the microphone signals $x_{f,t}$ may be the first probability $$\lambda_{f,t}^1$$

corresponding to the convergence value of the first spatial covariance matrix $$R_1^v$$

when the objective function converges. When the speech presence model is the second model, the probability that the microphone signals $x_{f,t}$ satisfy the speech presence model may be a second probability $$\lambda_{f,t}^2$$

that the microphone signals $x_{f,t}$ satisfy the second model. In such cases, the speech presence probability $$\lambda_{f,t}^{s+n}$$

corresponding to the convergence signals $x_{f,t}$ may be the second probability $$\lambda_{f,t}^2$$

corresponding to the convergence value of the second spatial covariance matrix $$R_2^v$$

when the objective function converges.

The computing device 240 may output the speech presence probability to other computing modules, such as a speech enhancement module, or the like.

In summary, in the system and the method P100 for determining the speech presence probability provided in the present disclosure, the computing device 240 may determine whether the first model or the second model is the speech presence model or the speech absence model according to the entropy $$\text{entropy}\left(\lambda^1_{f,t}\right)$$

of the first probability $$\lambda^1_{f,t}$$

corresponding to the first model and the entropy $$\text{entropy}\left(\lambda^2_{f,t}\right)$$

of the second probability $$\lambda^2_{f,t}$$

corresponding to the second model, such that the speech presence probability $$\lambda^{s+n}_{f,t}$$

of the microphone signals $x_{f,t}$ may be obtained, thereby correcting the misjudgment of the speech probability in the iterative process, and improving the accuracy of the determination of the speech presence probability $$\lambda^{s+n}_{f,t}.$$

Meanwhile, the computing device 240 may correct the first probability $$\lambda^1_{f,t}$$

and the second probability $$\lambda^2_{f,t}$$

according to the entropy $$\text{entropy}\left(\lambda^1_{f,t}\right)$$

of the first probability $$\lambda^1_{f,t}$$

and the entropy $$\text{entropy}\left(\lambda^2_{f,t}\right)$$

of the second probability $$\lambda^2_{f,t}$$

during the iteration operation such that the optimization parameters may iterate toward the target direction, thereby speeding up the convergence, and further improving the accuracy of the determination of the speech presence probability $$\lambda^{s+n}_{f,t}.$$

The present disclosure further provides a speech enhancement system. The speech enhancement system may also be applied to the electronic device 200. In some embodiments, the speech enhancement system may include the computing device 240. In some embodiments, the speech enhancement system may be applied to the computing device 240. That is, the speech enhancement system may operate on the computing device 240. The speech enhancement system may include a hardware device with a data information processing function and a necessary program to drive the hardware device to work. The speech enhancement system may also be only a hardware device with data processing capability, or just a program operating in the hardware device.

The speech enhancement system may store data or instructions for implementing the speech enhancement method described in the present disclosure, and may implement the data and/or instructions. When the speech enhancement system operates on the computing device 240, the speech enhancement system may obtain microphone signals from the microphone array 220 based on the communication connection, and implement the data or instructions of the speech enhancement method described in the present disclosure. The speech enhancement method may be described elsewhere in the present disclosure. For example, the speech enhancement method may be described in FIG. 7.

When the speech enhancement system operates on the computing device 240, the speech enhancement system may be in communication connection with the microphone array 220. The storage medium 243 may also include at least one instruction set stored in a data storage device and used for performing speech enhancement calculation on the microphone signals based on the MVDR algorithm. The instructions may be computer program codes. The computer program codes may include programs, routines, objects, components, data structures, procedures, modules, etc. for implementing the speech enhancement method of the present disclosure. The processor 242 may read the at least one instruction set, and implement the speech enhancement method of the present disclosure according to the instructions of the at least one instruction set. The processor 242 may implement all the operations included in the speech enhancement method.

Figure 7:
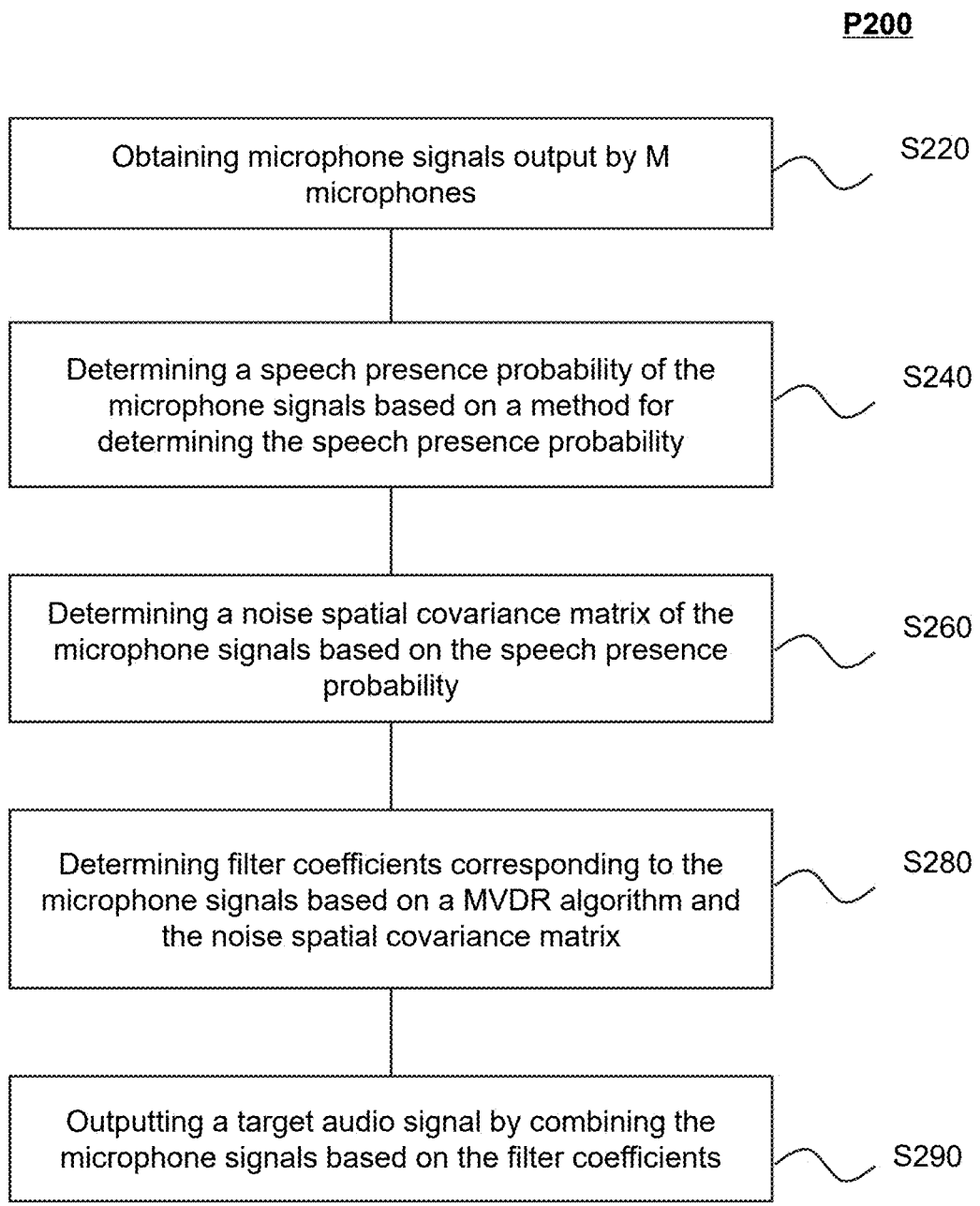
FIG. 7 is a flowchart illustrating a speech enhancement method according to some embodiments of the present disclosure.

FIG. 7 is a flowchart illustrating a speech enhancement method P200 according to the embodiments of the present disclosure. The method P200 may perform a speech enhancement operation on microphone signals based on an MVDR algorithm. Specifically, the processor 242 may implement the method P200. As shown in FIG. 7, the method P200 may include the following operations.

In S220: microphone signals xft output by M microphones may be obtained, which is described in S120 and not repeated here.

In S240: a speech presence probability $$\lambda_{f,t}^{s+n}$$

of the microphone signals $x_{f,t}$ may be determined based on the method P100 for determining the speech presence probability.

In S260: a noise spatial covariance matrix $$M_{f,t}^n$$

of the microphone signals $x_{f,t}$ may be determined based on the speech presence probability $$\lambda_{f,t}^{s+n}.$$

The noise spatial covariance matrix $$M_{f,t}^n$$

may be expressed as the following equation:

$$M_{f,t}^n = \frac{1}{\sum_t (1 - \lambda_{f,t}^{s+n})} \sum_t (1 - \lambda_{f,t}^{s+n}) x_{f,t} x_{f,t}^H. \tag{18}$$

In S280: filter coefficients $\omega_{f,t}$ corresponding to the microphone signals $x_{f,t}$ may be determined based on the MVDR algorithm and the noise spatial covariance matrix $$M_{f,t}^n.$$

The filter coefficients $\omega_{f,t}$ may be expressed as the following equation:

$$\omega_{f,t} = \frac{M_{f,t}^{n-1} a_f^s(\theta_s)}{a_f^s(\theta_s)^H M_{f,t}^{n-1} a_f^s(\theta_s)}, \tag{19}$$

where $$a_f^s(\theta_s)$$

is a guidance vector corresponding to a target direction where a target voice is located, $\theta_s$ is an incident angle of a signal corresponding to the target direction. In some embodiments, $\theta_s$ is known, and $$a_f^s(\theta_s)$$

is known. In some embodiments, $\theta_s$ is unknown, and the computing device 240 may determine the $$a_f^s(\theta_s)$$

by performing a subspace decomposition based on the noise spatial covariance matrix $$M_{f,t}^n.$$

In some embodiments, the filter coefficients oft may also be expressed as the following equation:

$$\omega_{f,t} = \frac{R_f^{n-1} a_f^s(\theta_s)}{a_f^s(\theta_s)^H R_f^{n-1} a_f^s(\theta_s)}, \tag{20}$$

where $$R_f^n$$

is a convergence value corresponding to the speech absence model. When the first model is the speech absence model, $$R_f^n$$

is convergence value corresponding to $$R_{1,f}^v.$$

When the second model is the speech absence model, $$R_f^n$$

is a convergence value corresponding to $$R_{2,f}^v.$$

In S290: a target audio signal $y_{f,t}$ may be output by combining the microphone signals $x_{f,t}$ based on the filter coefficients $\omega_{f,t}$.

The target audio signal $y_{f,t}$ may be expressed as the following equation:

$$y_{f,t} = \omega_{f,t}^H x_{f,t}. \tag{21}$$

The computing device 240 may output the target audio signal to other electronic devices, such as a remote communication device.

In summary, the system and the method P100 for determining the speech presence probability, the speech enhancement system and method P200, and the electronic device 200 of the present disclosure are used for the microphone array 220 including the plurality of microphones 222. The system and the method P100 for determining the speech presence probability, the speech enhancement system and method P200, and the electronic device 200 may obtain the speech presence model corresponding to a presence of speech in the plurality of microphone signals and the speech absence model corresponding to an absence of speech in the plurality of microphone signals, respectively, optimize the speech presence model and the speech absence model by performing, based on the MLE and the EM algorithm, an iteration operation on the speech presence model and the speech absence model, and correct the speech presence probability and the speech absence probability in the iteration operation according to the entropy of the speech presence probability and the entropy of the speech absence probability, thereby determining the model parameters of the speech presence model and the model parameters of the speech absence model, and obtaining the speech presence probability corresponding to the speech presence model when the MLE and the EM algorithm converge. According to the system and the method P100 for determining the speech presence probability, the speech enhancement system and method P200, and the electronic device 200, the speech presence probability and the speech absence probability in the iteration operation may be corrected by comparing the entropy of the speech presence probability and the entropy of the speech presence probability, such that a faster convergence speed and better convergence results may be obtained, which may improve the accuracy of the estimation of the speech presence probability and the accuracy of the estimation of the noise spatial covariance matrix, thereby improving the speech enhancement effect of the MVDR algorithm.

Another aspect of the present disclosure provides a non-transitory storage medium storing at least one set of executable instructions configured to determine the speech presence probability. When the executable instructions are executed by a processor, the executable instructions may cause the processor to implement the operations of the method P100 for determining the speech presence probability of the present disclosure. In some embodiments, various aspects of the present disclosure may also be implemented in the form of a program product, including program codes. When the program product operates on a computing device (e.g., the computing device 240), the program codes may be configured to cause the computing device to implement the operations for determining the speech presence probability of the present disclosure. A program product for implementing the method may include program codes on a portable compact disc read-only memory (CD-ROM), and may operate on a computing device. However, the program product in the present disclosure is not limited thereto. In the present disclosure, a readable storage medium may be any tangible medium containing or storing a program, and the program may be used by or in combination with an instruction execution system (e.g., the processor 242). The program product may reside on any combination of one or more readable media. The readable medium may be a readable signal medium or a readable storage medium. The readable storage medium may be, for example, but is not limited to, an electrical, magnetic, optical, electromagnetic, infrared, or semiconductor system, device, or device, or any combination thereof. More specific examples of readable storage media may include: an electrical connection with one or more leads, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. The non-transitory computer-readable storage medium may include a data signal propagated in a baseband or as part of a carrier carrying a readable program code. Such propagated data signal may take many forms, including but not limited to an electromagnetic signal, an optical signal, or any suitable combination thereof. The non-transitory readable storage medium may also be any readable medium other than a readable storage medium that can send, propagate, or transmit a program for use by or in conjunction with an instruction execution system, apparatus, or device. The program code contained on the non-transitory readable storage medium may be transmitted by any suitable medium, including but not limited to a wireless medium, a wired medium, an optical cable, RF, etc., or any suitable combination thereof. The program code for performing the operations of the present disclosure may be written in any combination of one or more programming languages, including object-oriented programming languages, such as Java, C++, etc., as well as conventional procedural programming languages, such as "C" or a similar programming language. The program code may be executed entirely on the computing device, partly on the computing device, as a stand-alone software package, partly on the computing device and partly on a remote computing device or entirely on the remote computing device.

The specific embodiments of the present disclosure are described above. Other embodiments are within the scope of the attached claims. In some cases, the actions or steps recited in the claims may be performed in an order different from that in the embodiments and still achieve desirable results. In addition, the processes depicted in the accompanying figures do not necessarily require the particular order shown, or sequential order, to achieve desirable results. Multitasking and parallel processing are also possible or advantageous in some embodiments.

To sum up, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These modifications, improvements, and amendments are intended to be suggested by this disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined. Characteristics of one or more embodiments of the present disclosure may be properly combined.

It should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this does not mean that the combination of these features is necessary, and it is entirely possible for those skilled in the art to extract some of the features as separate embodiments when reading the present disclosure. That is to say, the embodiments in the present disclosure may also be understood as the integration of multiple secondary embodiments. It is also true that each secondary embodiment lies in less than all features of a single preceding disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, the embodiments disclosed in the present disclosure are intended as examples only and not as limitations. Thus, by way of example, but not of limitation, alternative configurations of the embodiments of the disclosure may be utilized in accordance with the teachings herein. Accordingly, the embodiments of the present disclosure are not limited to that precisely as shown and described.

What is claimed is:

1. A method for determining a speech presence probability applied to M microphones arranged in a preset array, M being an integer greater than 1, and the method comprises:
    obtaining microphone signals output by the M microphones, the microphone signals satisfying a first model or a second model of a Gaussian distribution, one of the first model and the second model being a speech presence model, and the other of the first model and the second model being a speech absence model;
    constructing an objective function based on a maximum likelihood estimation (MLE) and an expectation maximization (EM) algorithm;
    determining optimization parameters, the optimization parameters including a first spatial covariance matrix corresponding to the first model and a second spatial covariance matrix corresponding to the second model;
    determining initial values of the optimization parameters;
    performing, based on the objective function and the initial values of the optimization parameters, a plurality of iterations on the optimization parameters until the objective function converges by:
        determining whether the speech presence model is the first model or the second model based on an entropy of a first probability that the microphone signals satisfy the first model and an entropy of a second probability that the microphone signals satisfy the second model in the plurality of iterations, the first probability being complementary to the second probability; and
        in response to that the objective function converges, outputting the first probability and the second probability corresponding to convergence values of the optimization parameters, and
    determining, based on a determination result of whether the speech presence model is the first model or the second model and one of the first probability and the second probability corresponding to the convergence values, a probability that the microphone signals satisfy the speech presence model as the speech presence probability of the microphone signals and outputting the speech presence probability.

2. The method of claim 1, wherein
    a first variance of the Gaussian distribution corresponding to the first model includes a product of a first parameter and the first spatial covariance matrix; and
    a second variance of the Gaussian distribution corresponding to the second model includes a product of a second parameter and the second spatial covariance matrix.

3. The method of claim 2, further comprising:
    in response to that the objective function converges, outputting the convergence values of the optimization parameters.

4. The method of claim 1, wherein the determining whether the speech presence model is the first model or the second model based on the entropy of the first probability and the entropy of the second probability in the plurality of iterations includes:
    in each iteration of the plurality of iterations, determining the entropy of the first probability and the entropy of the second probability, and determining whether the speech presence model is the first model or the second model by:
        in response to determining that the entropy of the first probability is greater than the entropy of the second probability, determining that the speech presence model is the second model; or
        in response to determining that the entropy of the first probability is less than the entropy of the second probability, determining that the speech presence model is the first model.

5. The method of claim 1, wherein the determining whether the speech presence model is the first model or the second model based on the entropy of the first probability and the entropy of the second probability in the plurality of iterations includes:
    in a first iteration of the plurality of iterations, determining the entropy of the first probability and the entropy of the second probability, and determining whether the speech presence model is the first model or the second model by:
        in response to determining that the entropy of the first probability is greater than the entropy of the second probability, determining that the speech presence model is the second model; or in response to determining that the entropy of the first probability is less than the entropy of the second probability, determining that the speech presence model is the first model.

6. The method of claim 5, wherein the performing the plurality of iterations on the optimization parameters further includes, in each iteration of the plurality of iterations:

correcting the first probability and the second probability based on the entropy of the first probability and the entropy of the second probability by:

in response to determining that the first model is the speech presence model and the entropy of the first probability is greater than the entropy of the second probability, designating the second probability as a corrected first probability and designating the first probability as a corrected second probability; or in response to determining that the second model is the speech presence model and the entropy of the second probability is greater than the entropy of the first probability, designating the second probability as a corrected first probability and designating the first probability as a corrected second probability; and updating the optimization parameters based on the corrected first probability and the corrected second probability.

7. The method of claim 1, wherein the performing the plurality of iterations on the optimization parameters further includes, in each iteration of the plurality of iterations:

performing a reversible correction on the optimization parameters by:

in response to determining that the optimization parameters are irreversible, correcting the optimization parameters based on a deviation matrix, the deviation matrix including one of an identity matrix, or a random matrix obeying a normal distribution or a uniform distribution.

8. The method of claim 1, further comprising:

determining a noise spatial covariance matrix of the microphone signals based on the speech presence probability;

determining filter coefficients corresponding to the microphone signals based on a minimum variance distortionless response (MVDR) algorithm and the noise spatial covariance matrix; and outputting a target audio signal by combining the microphone signals based on the filter coefficients.

9. A headphone, comprising:

a microphone array including the M microphones arranged in the preset array; and a computing device in communication connection to the microphone array during operation, and implements the method of claim 1.

10. The headphone of claim 9, wherein the M microphones are linearly distributed, M is less than or equal to 5, and a distance between adjacent microphones among the M microphones is in a range of 20 mm-40 mm.

11. The headphone of claim 9, further comprising:

a first housing, wherein the microphone array is mounted on the first housing, and the first housing includes a first interface including a first magnetic device; and a second housing, wherein the computing device is mounted on the second housing, and the second housing includes a second interface including a second magnetic device, wherein an adsorption force between the first magnetic device and the second magnetic device enables a detachable connection between the first housing and the second housing.

12. The headphone of claim 11, wherein the first housing further includes one or more contact points disposed at the first interface and in communication connection to the microphone array; and the second housing further includes a guide rail disposed at the second interface and in communication connection to the computing device, when the first housing is connected to the second housing, the one or more contact points are in contact with the guide rail such that the microphone array is in communication connection to the computing device.

* * * * *